(12) United States Patent
Nishimura et al.

(10) Patent No.: US 12,191,739 B2
(45) Date of Patent: Jan. 7, 2025

(54) POWER CONVERSION APPARATUS

(71) Applicant: DENSO CORPORATION, Kariya (JP)

(72) Inventors: Shusei Nishimura, Nisshin (JP); Seiji Iyasu, Nisshin (JP); Hisashi Umemoto, Kariya (JP); Atsushi Fukaya, Kariya (JP)

(73) Assignee: DENSO CORPORATION, Kariya (JP)

( * ) Notice: Subject to any disclaimer, the term of this patent is extended or adjusted under 35 U.S.C. 154(b) by 687 days.

(21) Appl. No.: 17/385,789

(22) Filed: Jul. 26, 2021

(65) Prior Publication Data

US 2021/0351684 A1 Nov. 11, 2021

Related U.S. Application Data

(63) Continuation of application No. PCT/JP2020/001772, filed on Jan. 20, 2020.

(30) Foreign Application Priority Data

Jan. 24, 2019 (JP) .................. 2019-010635
Nov. 5, 2019 (JP) .................. 2019-200919

(51) Int. Cl.
*H02J 7/00* (2006.01)
*H02K 47/04* (2006.01)
*H02J 7/14* (2006.01)

(52) U.S. Cl.
CPC ............ *H02K 47/04* (2013.01); *H02J 7/0047* (2013.01); *H02J 7/1423* (2013.01)

(58) Field of Classification Search
USPC ................ 320/101, 102, 103, 104, 105, 106
See application file for complete search history.

(56) References Cited

U.S. PATENT DOCUMENTS

| 6,882,061 | B1 | 4/2005 | Ashtiani et al. |
| 10,797,631 | B2 | 10/2020 | Nawa |
| 2021/0351684 | A1 | 11/2021 | Nishimura et al. |

FOREIGN PATENT DOCUMENTS

| JP | 2001037247 A | * | 2/2001 |
| JP | 5865736 B2 | | 2/2016 |
| WO | WO-2017051758 A1 | * | 3/2017 |

OTHER PUBLICATIONS

Feb. 25, 2020 International Search Report issued in International Patent Application No. PCT/JP2020/001772.

* cited by examiner

*Primary Examiner* — Brian Ngo
(74) *Attorney, Agent, or Firm* — Oliff PLC

(57) ABSTRACT

A power conversion apparatus includes: a rotating electric machine that has a winding; an inverter that has a series-connection body of an upper arm switch and a lower arm switch; and a capacitor that is connected in parallel to the series-connection body. The power conversion apparatus includes: a connection path that, in a first storage battery and a second storage battery that are connected in series, electrically connects the winding with both a negative-electrode side of the first storage battery and a positive-electrode side of the second storage battery; and a control unit that controls switching of the upper arm switch and the lower arm switch such that a current flows between the first storage battery and the second storage battery through the inverter, the winding, and the connection path.

20 Claims, 21 Drawing Sheets

(a)

(b)

COMPARISON EXAMPLE

POWER CONVERSION APPARATUS

CROSS-REFERENCE TO RELATED APPLICATIONS

The present application is a continuation application of International Application No. PCT/JP2020/001772, filed on Jan. 20, 2020, which claims priority to Japanese Patent Application No. 2019-010635, filed on Jan. 24, 2019, and Japanese Patent Application No. 2019-200919, filed on Nov. 5, 2019. The contents of these applications are incorporated herein by reference in their entirety.

BACKGROUND

Technical Field

The present disclosure relates to a power conversion apparatus.

Related Art

The power conversion apparatus includes a rotating electric machine that has a winding, an inverter that has a series-connection body of upper and lower arm switches, and a capacitor that is connected in parallel to the series-connection body. As this type of power conversion apparatus, a power conversion apparatus that performs temperature-increase control of a storage battery by performing an exchange of reactive power between the storage battery and the capacitor through the inverter is known.

SUMMARY

An aspect of the present disclosure provides a power conversion apparatus that includes: a rotating electric machine that has a winding; an inverter that has a series-connection body of an upper arm switch and a lower arm switch; and a capacitor that is connected in parallel to the series-connection body. The power conversion apparatus includes a connection path that, in a first storage battery and a second storage battery that are connected in series, electrically connects and the winding with both a negative-electrode side of the first storage battery and a positive-electrode side of the second storage battery, and a control unit that controls switching of the upper arm switch and the lower arm switch such that a current flows between the first storage battery and the second storage battery through the inverter, the winding, and the connection path.

BRIEF DESCRIPTION OF DRAWINGS

In the accompanying drawings:

FIG. 6 is a timing chart of transitions in a control aspect of switches and the like;

FIG. 19 is a timing chart of transitions in a control aspect of switches and the like;

DESCRIPTION OF THE EMBODIMENTS

Figure 1:
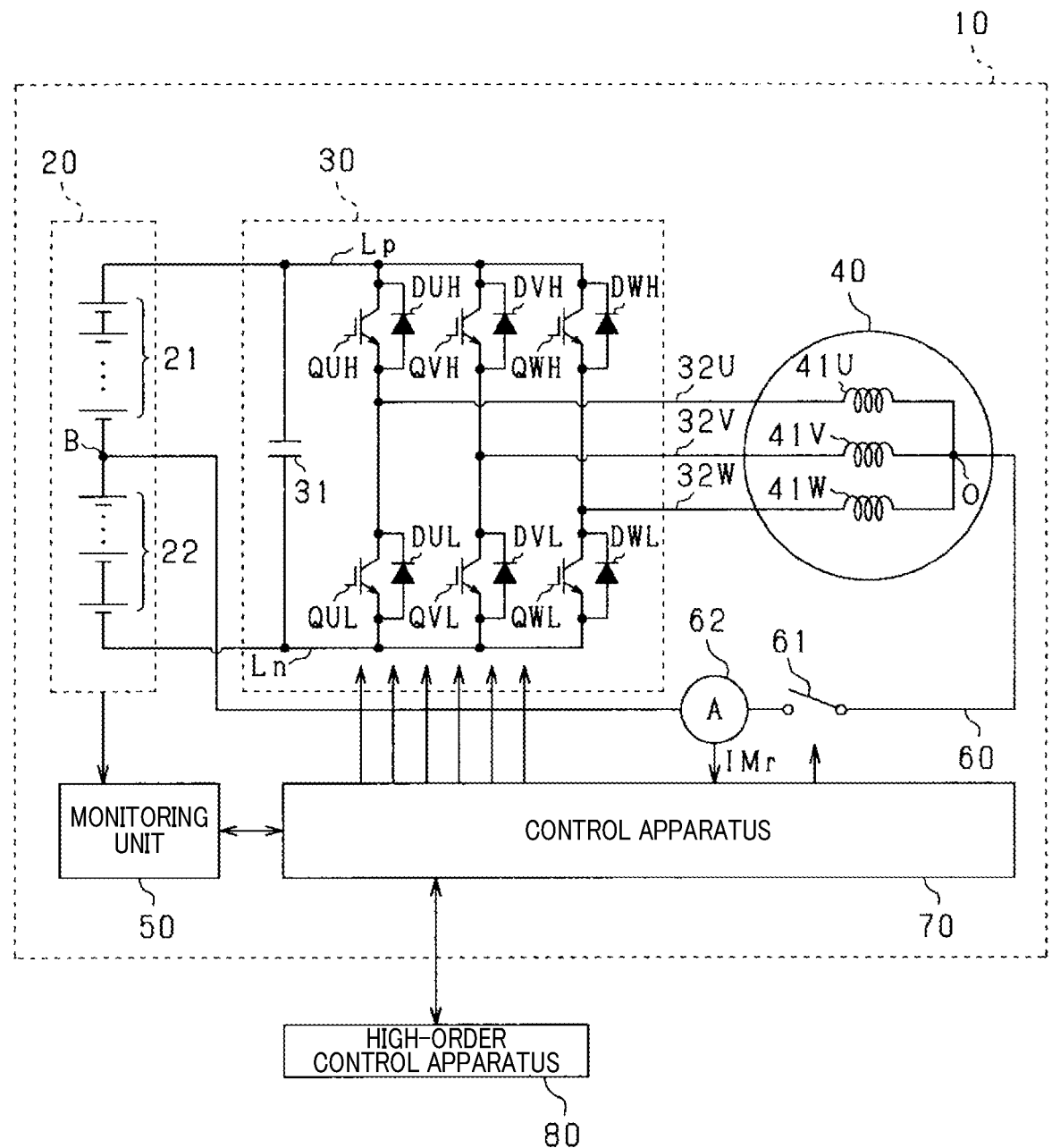
FIG. 1 is a configuration diagram of a power conversion apparatus according to a first embodiment.

The present disclosure relates to a power conversion apparatus that includes a rotating electric machine that has a winding, an inverter that has a series-connection body of upper and lower arm switches, and a capacitor that is connected in parallel to the series-connection body.

As this type of power conversion apparatus, as can be seen in Japanese Patent Publication No. 5865736, a power conversion apparatus that performs a process to increase the temperature of a storage battery by performing an exchange of reactive power between the storage battery and the capacitor through the inverter is known. Specifically, when a current is sent from the storage battery to the capacitor, the inverter and the winding is used as a step-up chopper circuit. When a current is sent from the capacitor to the storage battery, the inverter and the winding are used as the step-up chopper circuit.

In the power conversion apparatus described in Japanese Patent Publication No. 5865736, a terminal voltage of the capacitor varies in proportion to the reactive power because the reactive power is exchanged between the storage battery and the capacitor. As a result of this variation, the terminal voltage of the capacitor may exceed an allowable upper-limit value that is prescribed based on a withstand voltage performance of the capacitor. Reliability of the capacitor may decrease.

Meanwhile, as a result of the variation in the terminal voltage of the capacitor, the terminal voltage of the capacitor may become excessively low. When the current is sent from the storage battery to the capacitor through the inverter, the terminal voltage of the capacitor is required to be set higher than the terminal voltage of the storage battery. Therefore, when the terminal voltage of the capacitor becomes excessively low, the current that is sent from the storage battery to the capacitor may not be able to be controlled to a desired command current.

To address the above-described issue, a variation amount of the terminal voltage of the capacitor is required to be reduced. To reduce the variation amount, a measure in which a capacitance of the capacitor is increased can be considered. However, in this case, the capacitor increases in size.

Meanwhile, to reduce the variation amount, in addition to increasing the capacitance of the capacitor, a measure in which a frequency of the reactive power (ripple current) is increased can also be considered. However, in this case, noise increases. Noise, vibration, and harshness (NVH) characteristics of the power conversion apparatus deteriorate.

It is thus desired to provide a power conversion apparatus that is capable of reducing noise that is generated during temperature-increase control of a storage battery.

An exemplary embodiment of the present disclosure provides a power conversion apparatus that includes: a rotating electric machine that has a winding; an inverter that has a series-connection body of an upper arm switch and a lower arm switch; and a capacitor that is connected in parallel to the series-connection body. The power conversion apparatus includes a connection path that, in a first storage battery and a second storage battery that are connected in series, electrically connects a negative-electrode side of the first storage battery and a positive-electrode side of the second storage battery, and the winding, and a control unit that controls switching of the upper arm switch and the lower arm switch such that a current flows between the first storage battery and the second storage battery through the inverter, the winding, and the connection path.

A capacitance of the storage battery is sufficiently greater than a capacitance of the capacitor. Therefore, an increase/decrease amount of a terminal voltage in relation to a charging/discharge current of the storage battery is sufficiently less than an increase/decrease amount of a terminal voltage in relation to a charging/discharge current of the capacitor. Therefore, if electric power is able to be exchanged between the storage batteries rather than between the capacitor and the storage battery, a variation amount in the terminal voltage of the capacitor during temperature-increase control can be reduced without a switching frequency of the upper and lower arm switches being increased.

Here, to enable exchange of electric power between the storage batteries through the inverter, the present disclosure includes the connection path that, in the first storage battery and the second storage battery that are connected in series, electrically connects the negative-electrode side of the first storage battery and the positive-electrode side of the second storage battery, and the winding of the rotating electric machine. In addition, to increase a temperature of the first and second storage batteries, the control unit of the present disclosure controls switching of the upper arm switch and the lower arm switch such that a current flows between the first storage battery and the second storage battery through the inverter, the winding, and the connection path. As a result, the variation amount of the terminal voltage of the capacitor can be reduced without the switching frequency of the upper and lower arm switches being increased. Consequently, in the present disclosure described above, noise that is generated during temperature-increase control of the first and second storage batteries can be reduced.

First Embodiment

A first embodiment actualizing a power conversion apparatus of the present disclosure will hereinafter be described with reference to the drawings. According to the present embodiment, the power conversion apparatus is mounted in a vehicle.

As shown in FIG. 1, a power conversion apparatus 10 includes an inverter 30 and a rotating electric machine 40. The power conversion apparatus 10 provides a function for performing an exchange of electric power between an assembled battery 20 and the rotating electric machine 40 through the inverter 30 to increase a temperature of the assembled battery 20.

The rotating electric machine 40 is a three-phase synchronous motor and includes, as a stator winding, U-, V-, and W-phase windings 41U, 41V, and 41W that are connected by a star connection. The phase windings 41U, 41V, and 41W are arranged so as to be shifted from each other by an electrical angle of 120°. For example, the rotating electric machine 40 is a permanent-magnet synchronous motor. According to the present embodiment, the rotating electric machine 40 is a main onboard motor and is a source of traveling power of the vehicle.

The inverter 30 includes series-connection bodies composed of upper arm switches QUH, QVH, and QWH and lower arm switches QUL, QVL, and QWL that amount to three phases. According to the present embodiment, a voltage-control-type semiconductor switching element is used as each of the switches QUH, QVH, QWH, QUL, QVL, and QWL. Specifically, an insulated-gate bipolar transistor (IGBT) is used. Therefore, a high-potential-side terminal of each of the switches QUH, QVH, QWH, QUL, QVL, and QWL is a collector, and a low-potential-side terminal is an emitter. Diodes DUH, DVH, DWH, DUL, DVL, and DWL that serve as freewheeling diodes are connected in reverse parallel to the switches QUH, QVH, QWH, QUL, QVL, and QWL.

A first end of the U-phase winding 41U is connected to the emitter of the U-phase upper arm switch QUH and the collector of the U-phase lower arm switch QUL, by a U-phase conductive member 32U such as a bus bar. A first end of the V-phase winding 41V is connected to the emitter of the V-phase upper arm switch QVH and the collector of the V-phase lower arm switch QVL, by a V-phase conductive member 32V such as a bus bar. A first end of the W-phase winding 41W is connected to the emitter of the W-phase upper arm switch QWH and the collector of the W-phase lower arm switch QWL, by a W-phase conductive member 32W such as a bus bar. Second ends of the U-, V-, and W-phase windings 41U, 41V, and 41W are connected to one another at a neutral point O. Here, according to the present embodiment, the phase windings 41U, 41V, and 41W are set to have a same number of turns. As a result, for example, the phase windings 41U, 41V, 41W are set to have a same inductance.

The collectors of the upper arm switches QUH, QVH, and QWH and a positive electrode terminal of the assembled battery 20 are connected by a positive-electrode-side bus Lp, such as a bus bar. The emitters of the lower arm switches QUL, QVL, and QWL and a negative electrode terminal of the assembled battery 20 are connected by a negative-electrode-side bus Ln, such as a bus bar.

The power conversion apparatus 10 includes a capacitor 31 that is connected to the positive-electrode-side bus Lp and the negative-electrode-side bus Ln. Here, the capacitor 31 may be provided inside the inverter 30 or may be provided outside the inverter 30.

The assembled battery 20 is configured as a series-connection body of battery cells that serve as unit batteries. For example, a terminal voltage is several hundred V. According to the present embodiment, the terminal voltages (such as rated voltages) of the battery cells that configure the assembled battery 20 are set to be the same as one another. For example, as the battery cell, a secondary battery such as a lithium-ion battery can be used.

According to the present embodiment, among the battery cells that configure the assembled battery 20, the series-connection body of a plurality of battery cells on the high potential side configures a first storage battery 21, and the series-connection body of a plurality of battery cells on the low potential side configures a second storage battery 22. That is, the assembled battery 20 is divided into two blocks. According to the present embodiment, a number of battery cells configuring the first storage battery 21 and a number of battery cells configuring the second storage battery 22 are the same. Therefore, the terminal voltage (such as the rated voltage) of the first storage battery 21 and the terminal voltage (such as the rated voltage) of the second storage battery 22 are the same.

In the assembled battery 20, an intermediate terminal B is connected to a negative electrode terminal of the first storage battery 21 and a positive electrode terminal of the second storage battery 22.

The power conversion apparatus 10 includes a monitoring unit 50 (corresponding to a voltage information detecting unit). The monitoring unit 50 monitors the terminal voltage, a state-of-charge (SOC), a state-of-health (SOH), a temperature, and the like of each battery cell configuring the assembled battery 20.

The power conversion apparatus 10 includes a connection path 60 and a connection switch 61. The connection path 60 electrically connects the intermediate terminal B of the assembled battery 20 and the neutral point O. The connection switch 61 is provided on the connection path 60. According to the present embodiment, a relay is used as the connection switch 61. As a result of the connection switch 61 being set to be in an on-state, the intermediate terminal B and the neutral point O are electrically connected. Meanwhile, as a result of the connection switch 61 being set to be in an off-state, the connection between the intermediate terminal B and the neutral point O is electrically interrupted.

The power conversion apparatus 10 includes a current sensor 62 that detects a current that flows to the connection path 60. A detection value of the current sensor 62 is inputted to a control apparatus 70 (corresponding to a control unit) that is provided in the power conversion apparatus 10.

The control apparatus 70 is mainly configured by a microcomputer. The control apparatus 70 controls switching of the switches that configure the inverter 30 to perform feedback control of a controlled variable of the rotating electric machine 40 to a command value thereof. For example, the controlled variable is torque.

The control apparatus 70 performs on/off-control of the connection switch 61 and is capable of communicating with the monitoring unit 50. In addition, the control apparatus 70 is also capable of communicating with a high-order control apparatus 80 that is provided outside the power conversion apparatus 10. The high-order control apparatus 80 oversees control of the vehicle.

Here, the control apparatus 70 actualizes various control functions by running a program that is stored in a storage apparatus that is provided in the control apparatus 70. The various functions may be implemented by an electronic circuit that is hardware or may be implemented by both hardware and software.

Figure 2:
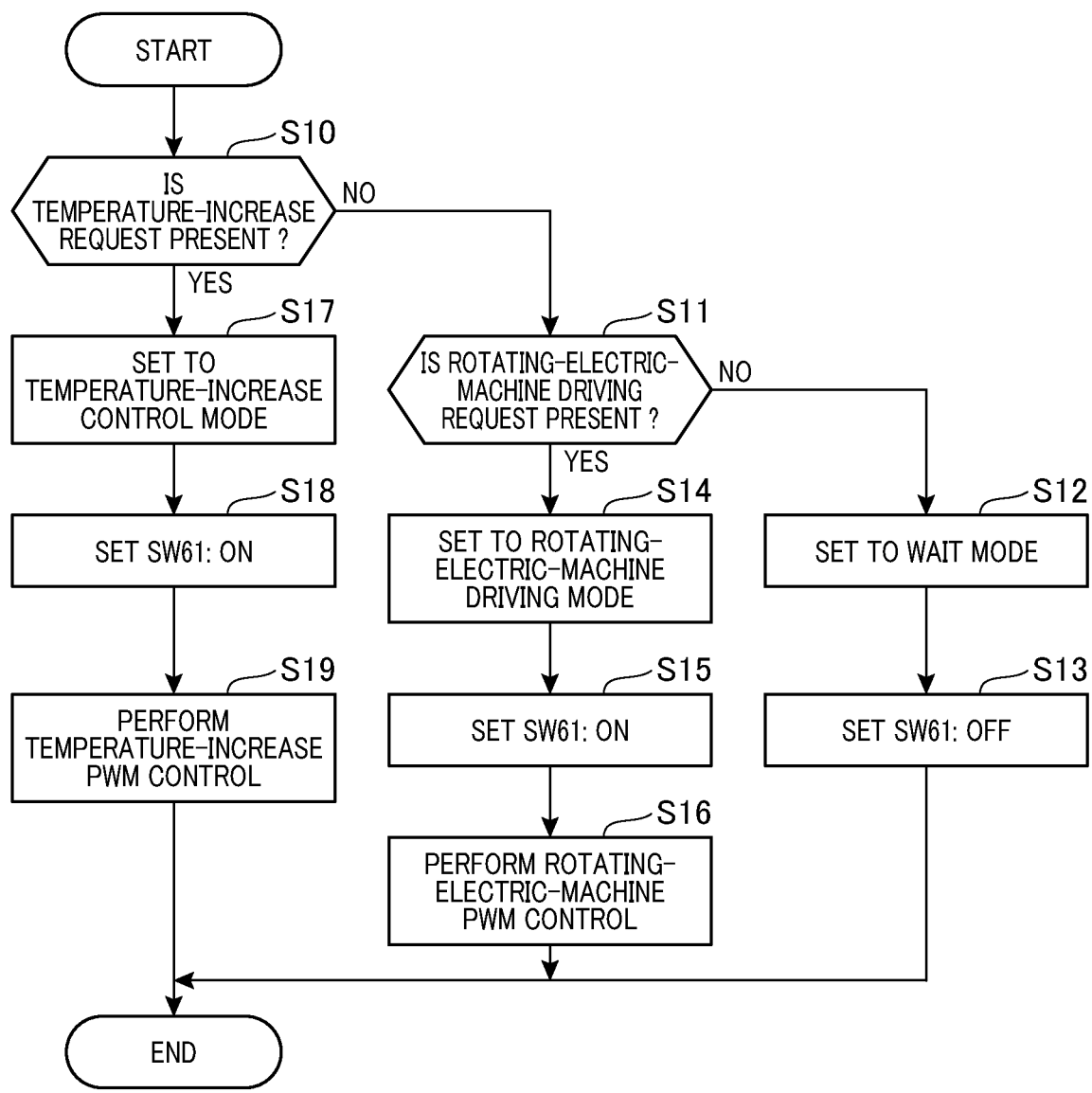
FIG. 2 is a flowchart of processing steps of a control apparatus.

Next, temperature-increase control of the assembled battery 20 that is performed by the control apparatus 70 will be described. FIG. 2 is a flowchart of steps in a temperature-increase control process. For example, the control apparatus 70 repeatedly performs this process at a predetermined control cycle.

At step S10, whether a temperature-increase request regarding the assembled battery 20 is present is determined. For example, the temperature-increase request may be determined to be present when a temperature-increase command regarding the assembled battery 20 is determined to be issued from the high-order control apparatus 80 or when the temperature of the assembled battery 20 detected by the monitoring unit 50 is determined to be less than a threshold temperature. Here, for example, the temperature that is compared to the threshold temperature may be a lowest temperature among the detected temperatures of the battery cells or an average temperature of the battery cells calculated based on the detected temperatures of the battery cells.

Here, according to the present embodiment, as a state in which an affirmative determination is made at step S10, a state in which the vehicle is stopped before driving of the rotating electric machine 40 commences is assumed.

When determined that the temperature-increase request is not present at step S10, the control apparatus 70 proceeds to step S11 and determines whether a driving request regarding the rotating electric machine 40 is present. According to the present embodiment, the driving request includes a request to make the vehicle travel by the rotating electric machine 40 being rotatably driven.

When determined that the driving request is not present at step S11, the control apparatus 70 proceeds to step S12 and sets an operating mode to a wait mode. As a result of this mode being set, the switches QUH to QWL of the inverter 30 are controlled to be off. In addition, at step S13, the connection switch 61 is controlled to be off. As a result, the connection between the intermediate terminal B and the neutral point O is electrically interrupted.

When determined that the driving request is present at step S11, the control apparatus 70 proceeds to step S14 and sets the operating mode to a driving mode for the rotating electric machine 40. Then, at step S15, the connection switch 61 is controlled to be on. As a result, the intermediate terminal B and the neutral point P are electrically connected by the connection path 60. Subsequently, at step S16, switching control of the switches QUH to QWL of the inverter 30 is performed to rotatably drive the rotating electric machine 40. As a result, a driving wheel of the vehicle rotates, and the vehicle can be made to travel. Here, for example, the switching control at step S16 may be performed using pulse width modulation (PWM) that is based on a comparison of magnitude between command voltages that are applied to the phase windings 41U to 41W and a carrier signal (such as a triangular-wave signal), or a pulse pattern.

When determined that the temperature-increase request is present at step S10, the control apparatus 70 proceeds to step S17 and sets the operating mode to a temperature-increase control mode. At step S18, the connection switch 61 is controlled to be on.

At step S19, temperature-increase PWM control that increases the temperature of the assembled battery 20 is performed. This control will be described below.

Figure 3:
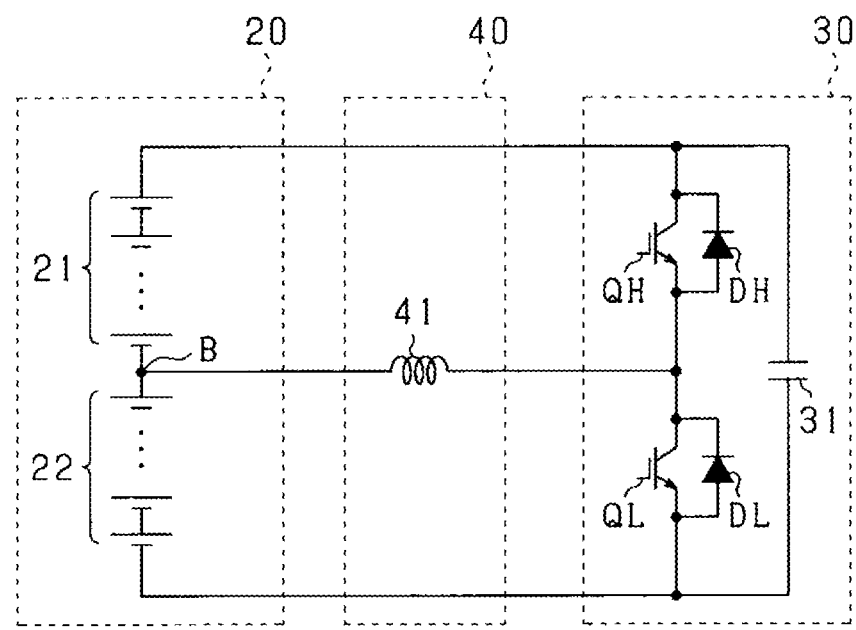
FIG. 3 shows diagrams of equivalent circuits.
Figure 3:
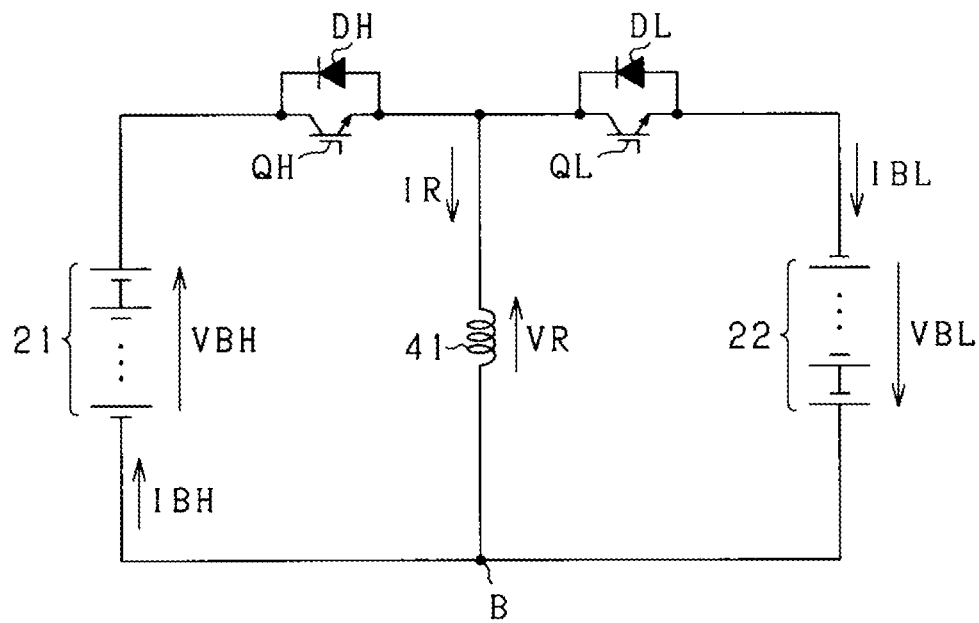

FIG. 3(a) shows an equivalent circuit of the power conversion apparatus 10 that is used in the temperature-increase PWM control. In FIG. 3(a), the phase windings 41U to 41W are denoted as a winding 41. The upper arm switches QUH, QVH, and QWH are denoted as an upper arm switch QH, and the upper arm diodes DUH, DVH, and DWH are denoted as an upper arm diode DH. In addition, the lower arm switches QUL, QVL, and QWL are denoted as a lower arm switch QL, and the lower arm diodes DUL, DVL, and DWL are denoted as a lower arm diode DL.

The equivalent circuit in FIG. 3(a) can be expressed as an equivalent circuit in FIG. 3(b). The circuit in FIG. 3(b) is a step-up/step-down chopper circuit that is capable of bi-directional power transmission between the first storage battery 21 and the second storage battery 22. In FIG. 3(b), VBH denotes a terminal voltage of the first storage battery 21. IBH denotes a current that flows to the first storage battery 21. VBL denotes a terminal voltage of the second storage battery 22. IBL denotes a current that flows to the second storage battery 22. When a charging current flows to the first and second storage batteries 21 and 22, IBH and IBL are negative. When a discharge current flows to the first and second storage batteries 21 and 22, IBH and IBL are positive. In addition, VR denotes a terminal voltage of the winding 41. IR denotes a current that flows to the neutral point O. When a current flows to the neutral point O in a positive direction from the winding 41 towards the intermediate terminal B, IR is negative. When a current flows to the neutral point O in a direction opposite the foregoing, IR is positive.

With reference to FIG. 3(b), when the upper arm switch QH is in the on-state, the terminal voltage VR of the winding 41 is "VBH." Meanwhile, when the lower arm switch QL is in the on-state, the terminal voltage VR of the winding 41 is "−VBL." That is, as a result of the upper arm switch QH being set to be in the on-state, an excitation current can be sent to the winding 41 in the positive direction. As a result of the lower arm switch QL being set to be in the on-state, an excitation current can be sent to the winding 41 in the negative direction.

Figure 4:
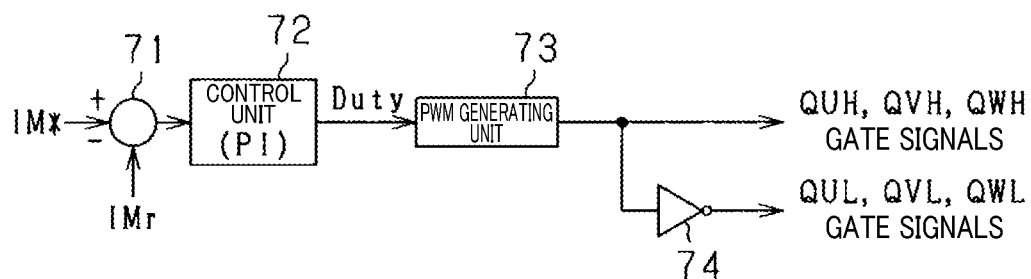
FIG. 4 is a functional block diagram of the control apparatus.

FIG. 4 shows a block diagram of the temperature-increase PWM control.

Figure 5:
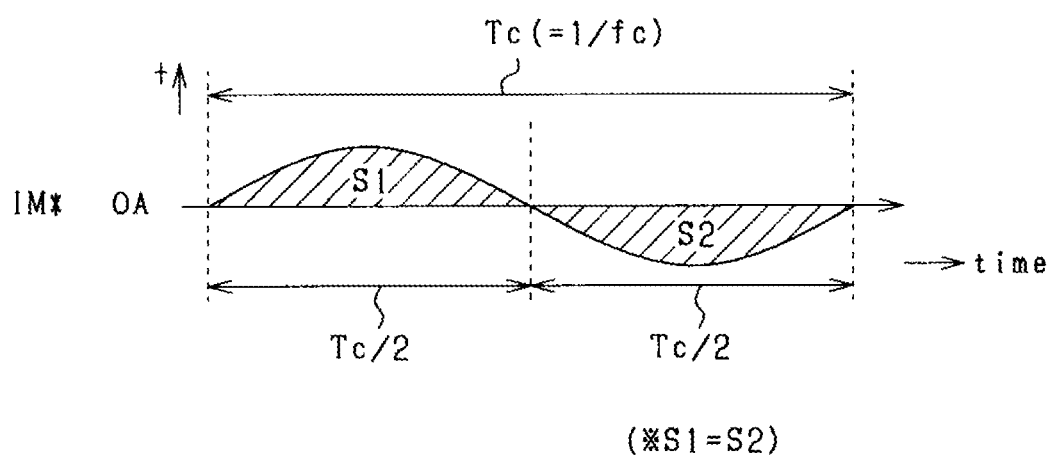
FIG. 5 is a diagram of a method of setting a command current.

In the control apparatus 70, a current deviation calculating unit 71 calculates a current deviation by subtracting a current (hereafter, a detection current IMr) that is detected by the current sensor 62 from a command current IM*. According to the present embodiment, as shown in FIG. 5, the command current IM* is set as a sine wave. Specifically, the command current IM* is set such that, in a single cycle Tc of the command current IM*, a positive command current IM* and a negative command current IM* are have point symmetry in relation to a zero-crossing timing of the command current IM*. As a result, a period from a zero up-crossing timing to a zero down-crossing timing of the command current IM*, and a period from a zero down-crossing timing to a zero up-crossing timing of the command current IM* are the same. In addition, in the single cycle Tc of the command current IM*, an area S1 of a first region and an area S2 of a second region are equal. The first region S1 is a region that is surrounded by a time axis from the zero up-crossing timing to the zero down-crossing timing of the command current IM* and the positive command current IM*, in the single cycle TC of the command current IM*. The second region is a region that is surrounded by a time axis from the zero down-crossing timing to the zero up-crossing timing of the command current IM* and the negative command current IM*, in the single cycle TC of the command current IM*. As a result of S1=S2 being set, charging and discharge currents of the first storage battery 21 and the second storage battery 22 in the single cycle Tc can be balanced. A difference between the terminal voltage of the first storage battery 21 and the terminal voltage of the second storage battery 22 increasing in accompaniment with temperature-increase control can be suppressed.

Here, for example, a frequency fc of the command current IM* that is an inverse of the single cycle Tc of the command current IM* is preferably set to a frequency that is on a lower limit side of a human audible range. Specifically, the frequency fc is preferably set to be equal to or less than 1 kHz that is a frequency range in which a correction value (dB) for A-weighting is equal to or less than 0, and more preferably set to a frequency (such as 50 Hz) between 30 Hz and 100 Hz.

A feedback control unit 72 calculates a duty ratio Duty as a manipulated variable for performing feedback control of the calculated current deviation to 0. The duty ratio Duty is a value that prescribes a ratio (Ton/Tsw) of an on-time Ton in a single switching cycle Tsw of the switches QUH to QWL. Here, for example, feedback control that is used in the feedback control unit 72 may be proportional-integral control.

A PWM generating unit 73 generates gate signals of the upper arm switches QUH, QVH, and QWH based on the calculated duty ratio Duty. The gate signal is a signal that commands on-control or off-control. According to the present embodiment, the gate signals are synchronized.

An inverting unit 74 generates gate signals of the lower arm switches QUL, QVL, and QWL by inverting logics of the gate signals of the upper arm switches QUH, QVH, and QWH generated by the PWM generating unit 73. According to the present embodiment, the gate signals of the lower arm switches QUL, QVL, and QWL are synchronized.

Figure 6:
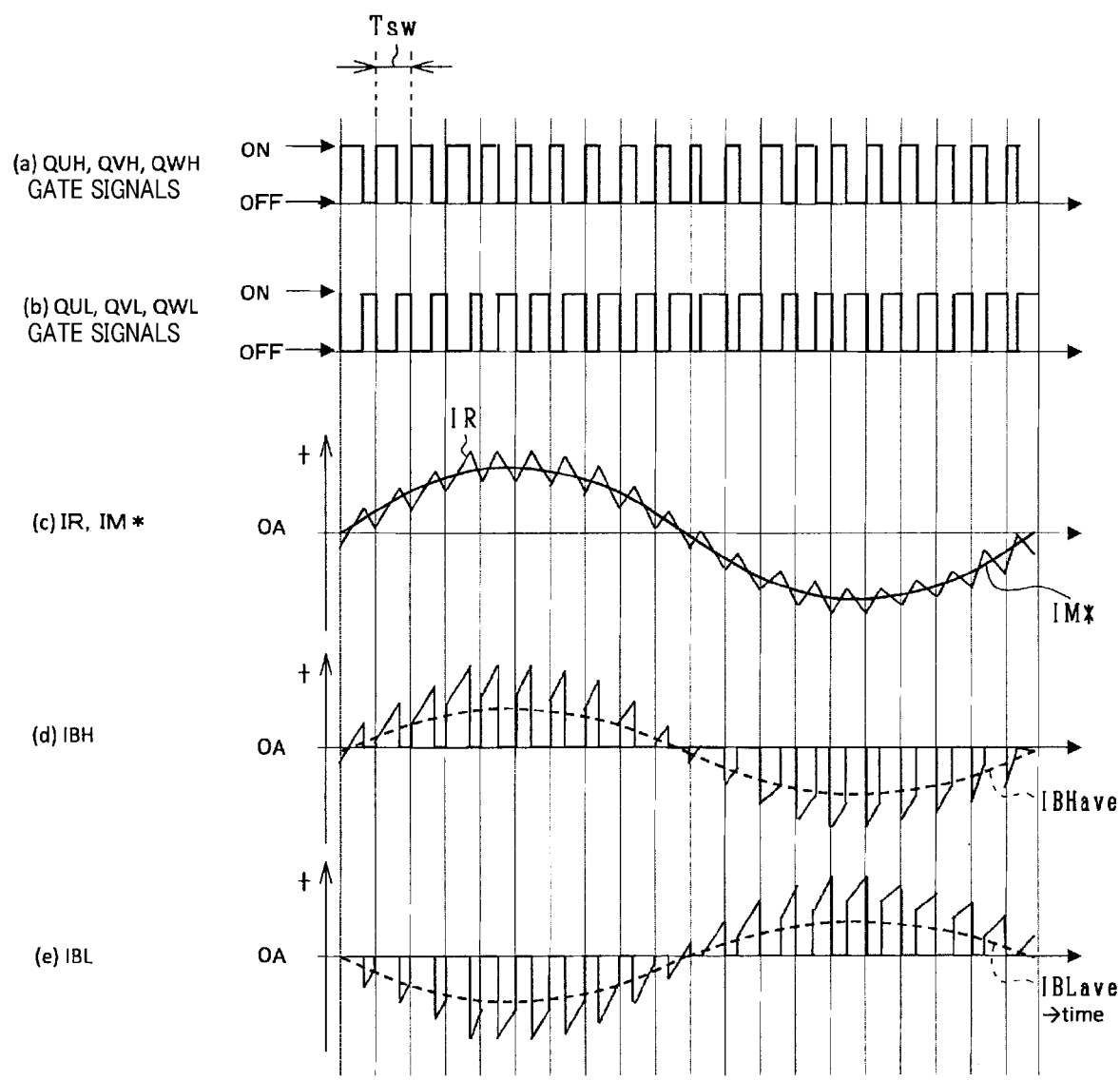

FIG. 6 is a diagram of transitions in a switching pattern and the like during the temperature-increase PWM control. FIG. 6(a) shows the transitions in the gate signals of the upper arm switches QUH, QVH, and QWH. FIG. 6(b) shows the transitions in the gate signals of the lower arm switches QUL, QVL, and QWL. FIG. 6(c) shows the transitions in the current IR that flows to the neutral point O and the transitions in the command current IM*. FIG. 6(d) shows the transitions in the current IBH that flows to the first storage battery 21. FIG. 6(e) shows the transitions in the current IBL that flows to the second storage battery 22.

The temperature-increase PWM control in which the upper arm switches QUH, QVH, and QWH and the lower arm switches QUL, QVL, and QWL are alternately controlled to be on is performed as in FIGS. 6(a) and (b). This control is continued until the temperature-increase request at step S10 in FIG. 2 is no longer present. As a result of this control, pulse-like currents flow to the first storage battery 21 and the second storage battery 22 as shown in FIGS. 6(d) and (e). During a period in which the command current IM* is positive, the first storage battery 21 discharges and the second storage battery 22 is charged. Meanwhile, during a period in which the command current IM* is negative, the second storage battery 22 discharges and the first storage battery 21 is charged. Here, average values IBHave and IBLave of the above-described pulse-like currents are sine-wave-shaped currents that include a component of a same frequency as the frequency of the command current IM*.

Figure 7:
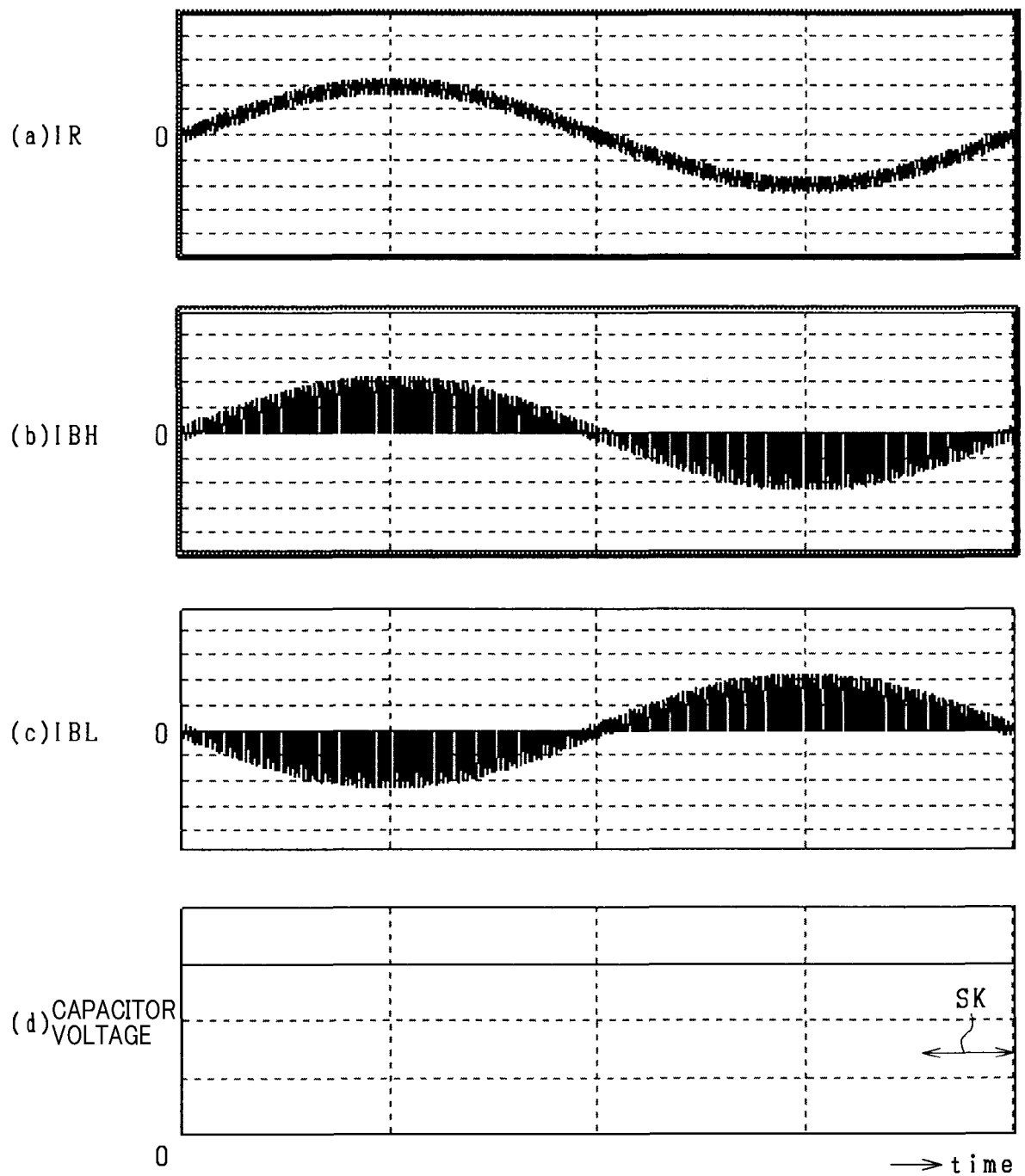
FIG. 7 is a diagram of simulation results.

FIG. 7 shows simulation results according to the present embodiment. FIGS. 7(a) to (c) correspond to foregoing FIGS. 6(c) to (e) and FIG. 7(d) shows the transitions in the terminal voltage of the capacitor 31. As shown in FIG. 7(d), the terminal voltage of the capacitor 31 does not vary.

Figure 8:
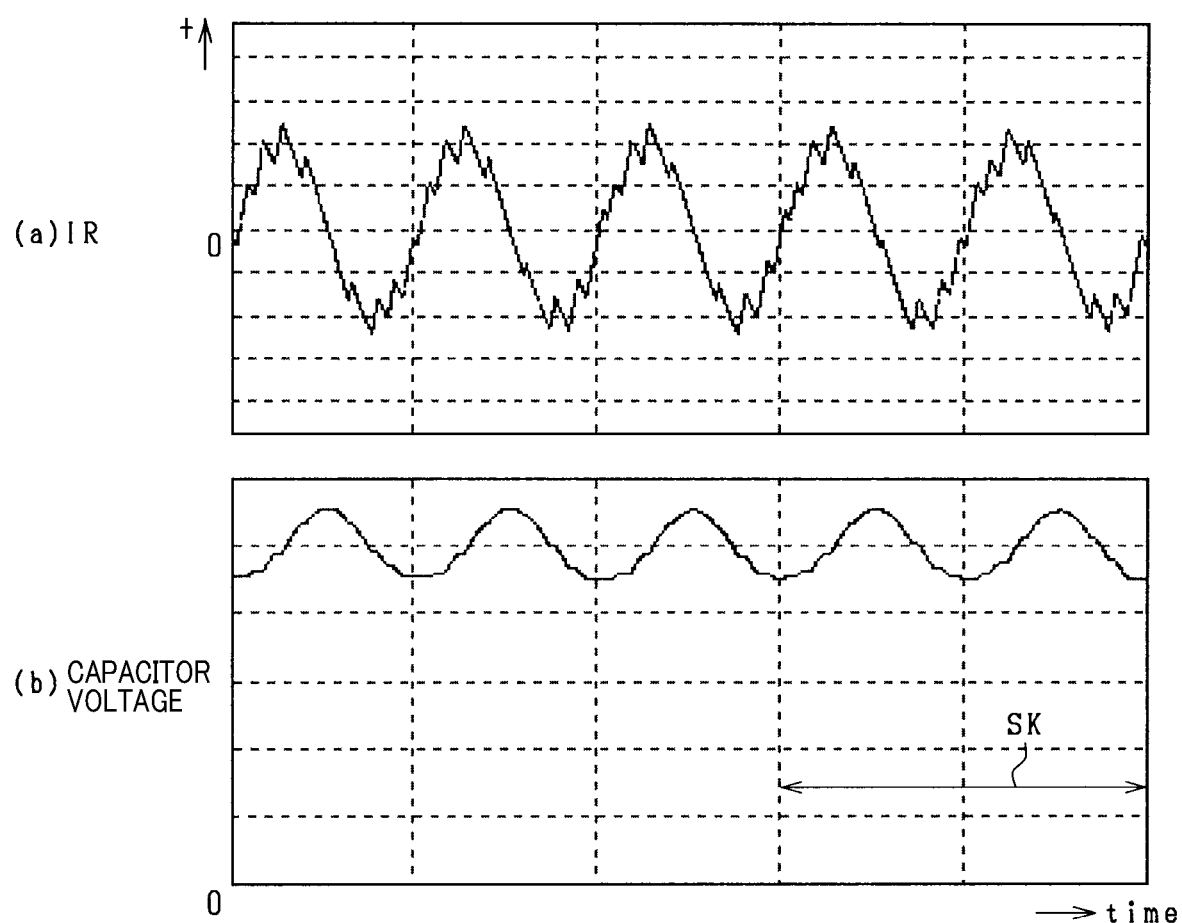
FIG. 8 is a diagram of simulation results of a comparison example.

FIG. 8 shows simulation results of a comparison example that is a configuration described in above-described Japanese Patent Publication No. 5865736. FIGS. 8(a) and (b) correspond to foregoing FIGS. 7(a) and (d). Here, SK shown in FIG. 8(b) and FIG. 7(d) is a reference number for indicating a scale of the time axis.

As shown in FIG. 8(b), in the comparison example, the terminal voltage of the capacitor significantly varies at a same cycle as the current IR that flows to the neutral point O. To reduce this variation, increasing a capacitance of the capacitor or reducing an amplitude of the command current IM*, that is, temperature-increase capability is required.

According to the present embodiment described in detail above, following effects can be obtained.

The intermediate terminal B and the neutral point O are connected by the connection path 60 without the switches QUH to QWL of the inverter 30 therebetween. In this configuration, the control apparatus 70 controls switching of the inverter 30 such that a ripple current flows between the first storage battery 21 and the second storage battery 22 through the inverter 30, the phase windings 41U, 41V, and 41W, and the connection path 60. As a result, the variation amount of the terminal voltage of the capacitor 31 can be reduced without the frequency fc(=1/Tc) of the reactive power (ripple current) being increased. Consequently, noise that is generated during temperature-increase control of the assembled battery 20 can be reduced.

In addition, because the variation amount of the terminal voltage of the capacitor 31 can be reduced, the capacitance of the capacitor 31 can be reduced and the capacitor 31 can be reduced in size.

The control apparatus 70 synchronizes switching control of the upper arm switches QUH, QVH, and QWH of all phases and synchronizes switching control of the lower arm switches QUL, QVL, and QWL of all phases in temperature-increase control. As a result, the phase windings 41U, 41V, and 41W can be considered to be an equivalent circuit in which the windings are connected in parallel. Therefore, the inductance of the windings during temperature-increase control can be reduced. Consequently, the variation amount of the current that flows to the neutral point O during the single switching cycle Tws can be increased, and temperature-increase control can be performed using a large current.

Furthermore, as a result of switching control being synchronized, a rotor of the rotating electric machine 40 being rotatably driven can be suppressed.

When determined that the temperature-increase request regarding the assembled battery 20 is present, the control apparatus 70 sets the connection switch 61 to be in the on-state. When determined that the temperature-increase request is not present, the control apparatus 70 sets the connection switch 61 to be in the off-state. Consequently, a current flowing from the neutral point O to the intermediate terminal B during vehicle traveling can be suppressed.

Variation Example 1 According to the First Embodiment

Figure 9:
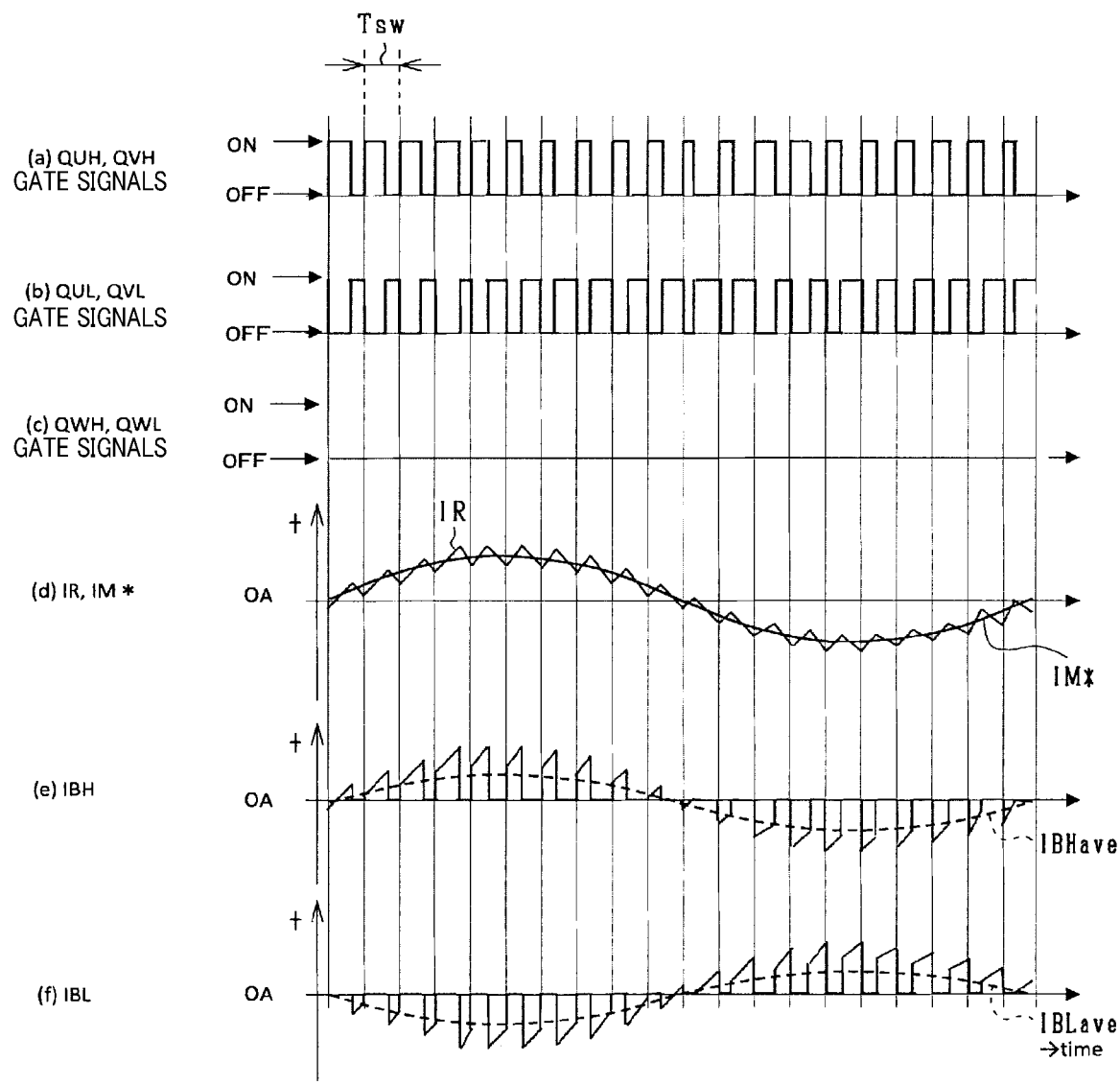
FIG. 9 is a timing chart of transitions in the control aspect of the switches and the like in a variation example 1 according to the first embodiment.

As shown in FIG. 9, the temperature-increase PWM control may be performed by two phases of the three phases being controlled to be on/off. FIG. 9 shows an example in which the W-phase upper and lower arm switches QWH and QWL are kept in off-control. FIG. 9(a) shows the transitions in the gate signals of the U- and V-phase upper arm switches QUH and QVH. FIG. 9(b) shows the transitions in the gate signals of the U- and V-phase lower arm switches QUL and QVL. FIG. 9(c) shows the transitions in the gate signals of the W-phase upper and lower arm switches QWH and QWL. FIGS. 9(d) to (f) correspond to foregoing FIGS. 6(c) to (e).

Figure 10:
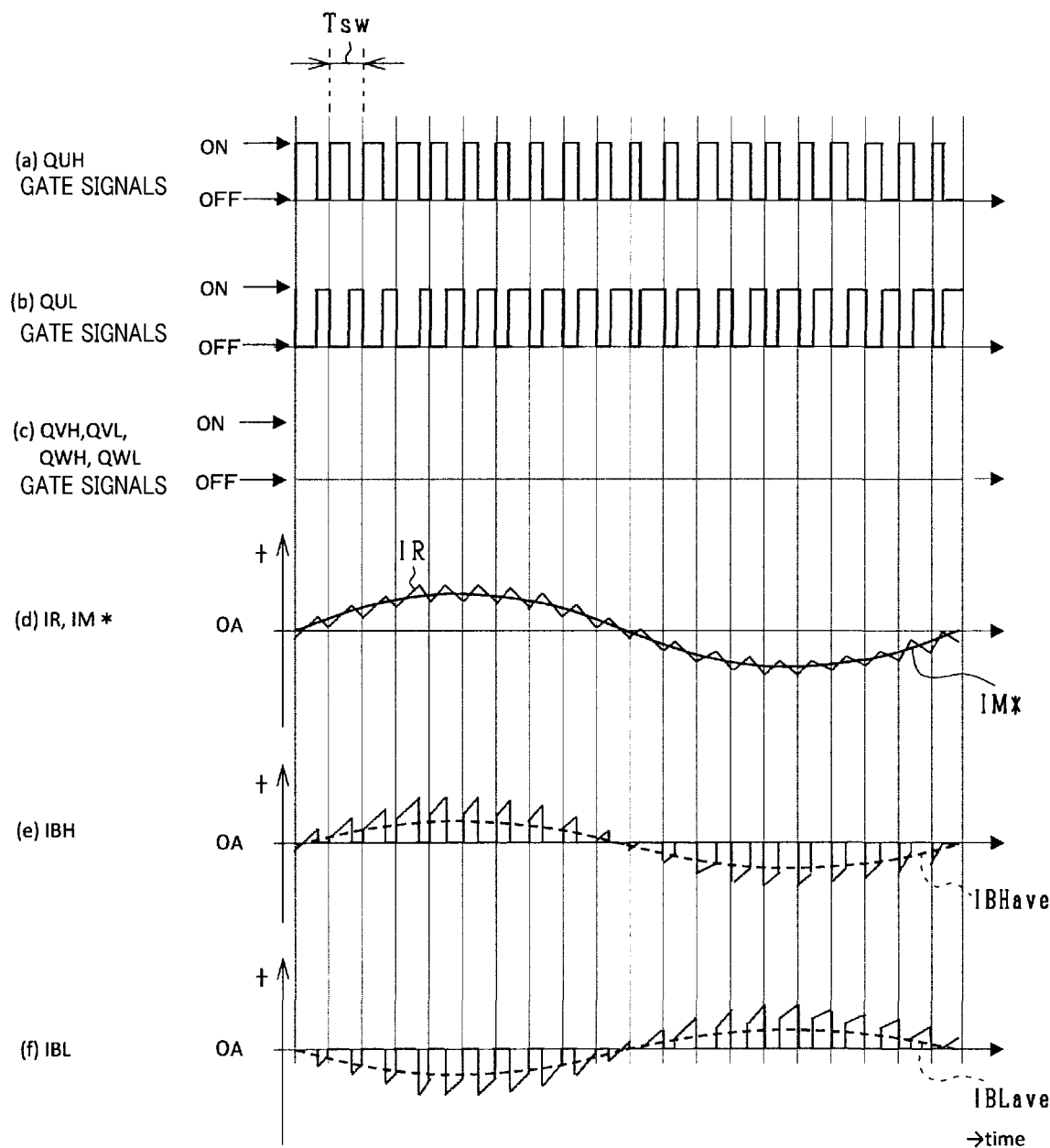
FIG. 10 is a timing chart of transitions in the control aspect of switches and the like in the variation example 1 according to the first embodiment.

In addition, as shown in FIG. 10, the temperature-increase PWM control may be performed by one phase of the three phases being controlled to be on/off. FIG. 10 shows an example in which only the U-phase upper and lower arm switches QUH and QUL are controlled to be on/off. FIGS. 10(a) and (b) show the transitions in the gate signals of the U-phase upper and lower arm switches QUH and QUL. FIG. 10(c) show the transitions in the V-phase upper and lower arm switches QVH and QVL, and the W-phase upper and lower arm switches QWH and QWL. FIGS. 10(d) to (f) correspond to foregoing FIGS. 9(d) to (f).

Even in the switching control shown in FIG. 9 and FIG. 10, when the ripple current is small, an equivalent inductance of the winding 41 can be increased and current ripple can be reduced. In some cases, iron loss can be reduced compared to when switching control of all phases is performed.

Variation Example 2 According to the Second Embodiment

Figure 11:
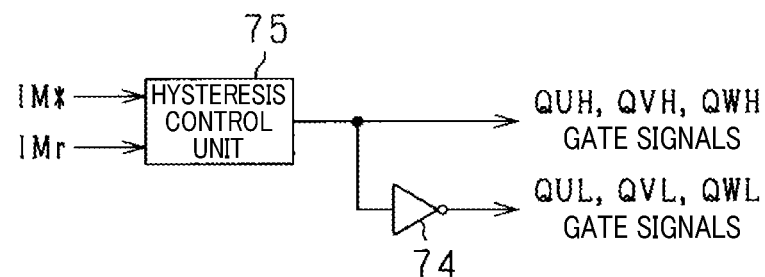
FIG. 11 is a functional block diagram of the control apparatus in a variation example 2 according to the first embodiment.
Figure 12:
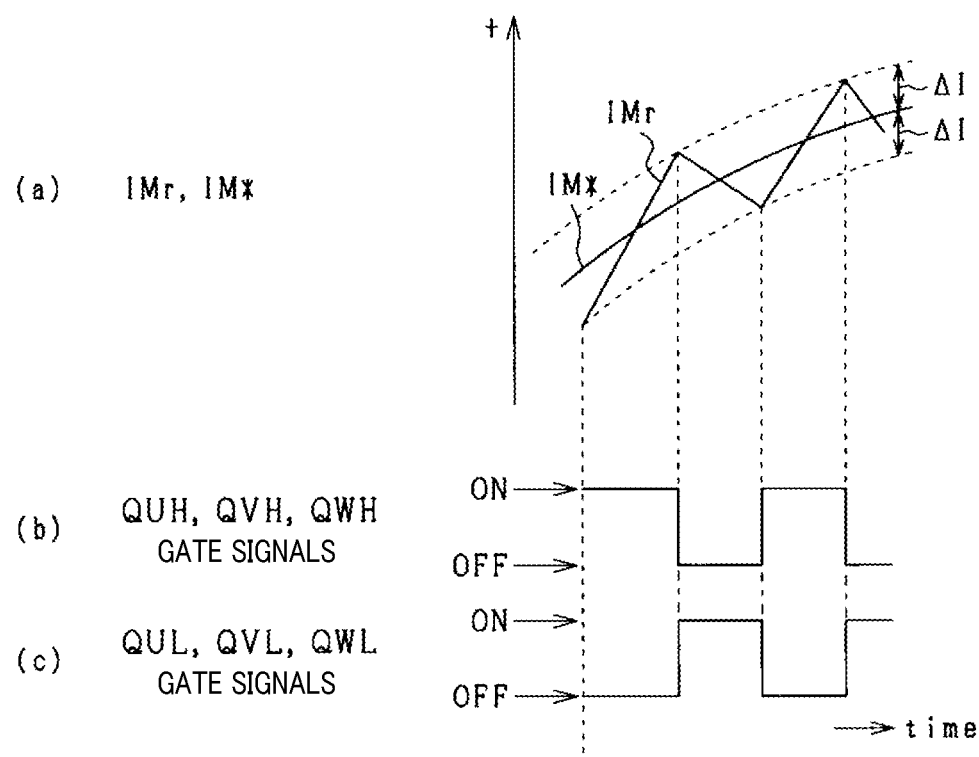
FIG. 12 is a timing chart of a hysteresis control aspect.

Switching control may be performed by a configuration shown in FIG. 11, instead of the configuration in FIG. 4. In the control apparatus 70, a hysteresis control unit 75 generates the gate signals of the upper arm switches QUH, QVH, and QWH shown in FIG. 12(b) based on the command current IM* and the detection current IMr. Specifically, the hysteresis control unit 75 generates the gate signals of the upper arm switches QUH, QVH, and QWH based on a current deviation between the command current IM* and the detection current IMr. The inverting unit 74 generates the gate signals of the lower arm switches QUL, QVL, and QWL shown in FIG. 12(c) by inverting the logics of the gate signals of the upper arm switches QUH, QVH, and QWH generated by the hysteresis control unit 75. As a result, as shown in FIG. 12(a), the detection current IMr is controlled within a range that has a width of $\pm\Delta I$ in relation to the command current IM*.

Second Embodiment

A second embodiment will be described below with reference to the drawings, mainly focusing on differences with the first embodiment.

Figure 13:
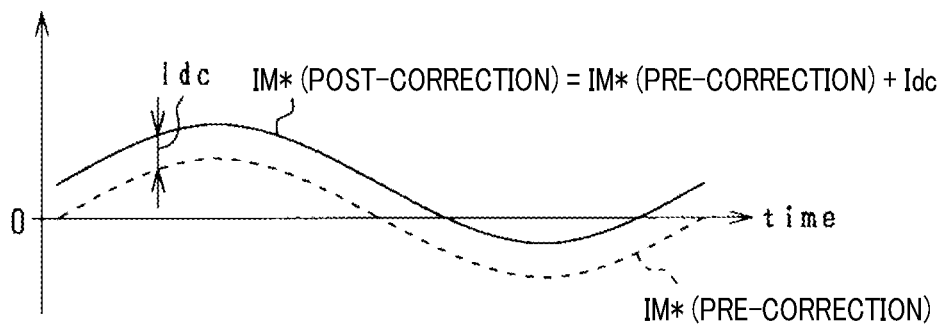
FIG. 13 is a diagram of a correction method for a command current according to a second embodiment.

According to the present embodiment, the control apparatus 70 corrects the command current IM* such that the terminal voltage of the first storage battery 21 and the terminal voltage of the second storage battery 22 are equalized. Specifically, the control apparatus 70 calculates a terminal voltage VHr of the first storage battery 21 and a terminal voltage VLr the second storage battery 22 based on information transmitted from the monitoring unit 50. Then, when determined that the terminal voltage VHr of the first storage battery 21 is higher than the terminal voltage VLr of the second storage battery 22, as shown in FIG. 13, the control apparatus 70 calculates a post-correction command current by adding a direct-current component Idc (>0) to the command current IM*. As a result, in the post-correction command current in the single cycle Tc, the area S1 of the first region is greater than the area S2 of the second region. Consequently, in the single cycle Tc, the discharge current of the first storage battery 21 exceeds the discharge current of the second storage battery 22. The terminal voltage of the first storage battery 21 and the terminal voltage of the second storage battery 22 are equalized.

Figure 14:
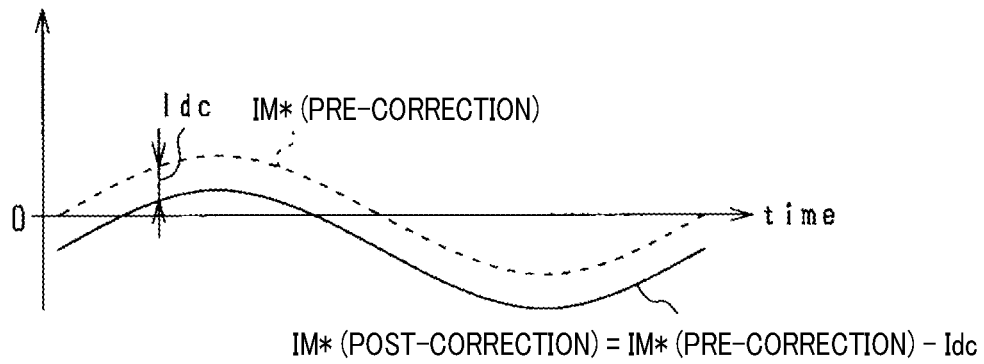
FIG. 14 is a diagram of a correction method for the command current.

Meanwhile, when determined that the terminal voltage VHr of the first storage battery 21 is lower than the terminal voltage VLr of the second storage battery 22, as shown in FIG. 14, the control apparatus 70 calculates the post-correction command current by subtracting the direct-current component Idc from the command current IM*. As a result, in the post-correction command current in the single cycle Tc, the area S1 of the first region is less than the area S2 of the second region. Consequently, in the single cycle Tc, the discharge current of the second storage battery 22 exceeds the discharge current of the first storage battery 21. The terminal voltage of the first storage battery 21 and the terminal voltage of the second storage battery 22 are equalized.

According to the present embodiment described above, equalization of the terminal voltage of the first storage battery 21 and the terminal voltage of the second storage battery 22 can be obtained while temperature-increase control is performed.

Variation Example According to the Second Embodiment

The direct-current component Idc may be variably set based on a voltage difference between the terminal voltage of the first storage battery 21 and the terminal voltage of the second storage battery 22. Specifically, for example, when the terminal voltage VHr of the first storage battery 21 is higher than the terminal voltage VLr of the second storage battery 22, the direct-current component Idc can be set to be greater as "VHr−VLr" increases. In addition, when the terminal voltage VHr of the first storage battery 21 is lower than the terminal voltage VLr of the second storage battery 22, the direct-current component Idc can be set to be greater as "VLr−VHr" increases.

In a correction process for the command current IM*, instead of the terminal voltages of the storage batteries, for example, a lowest voltage among the terminal voltages of the battery cells configuring each storage battery, or an average value of the terminal voltages of the battery cells configuring each storage battery may be used.

Third Embodiment

A third embodiment will be described below with reference to the drawings, mainly focusing on differences with the first embodiment. According to the present embodiment, the control apparatus 70 sets a switching frequency fsw(=1/Tsw) when driving of the rotating electric machine 40 is stopped to a frequency that is higher than a switching frequency of the upper and lower arm switches QUH to QWL when the rotating electric machine 40 is rotatably driven and the vehicle is traveling, and in a human inaudible range.

Figure 15:
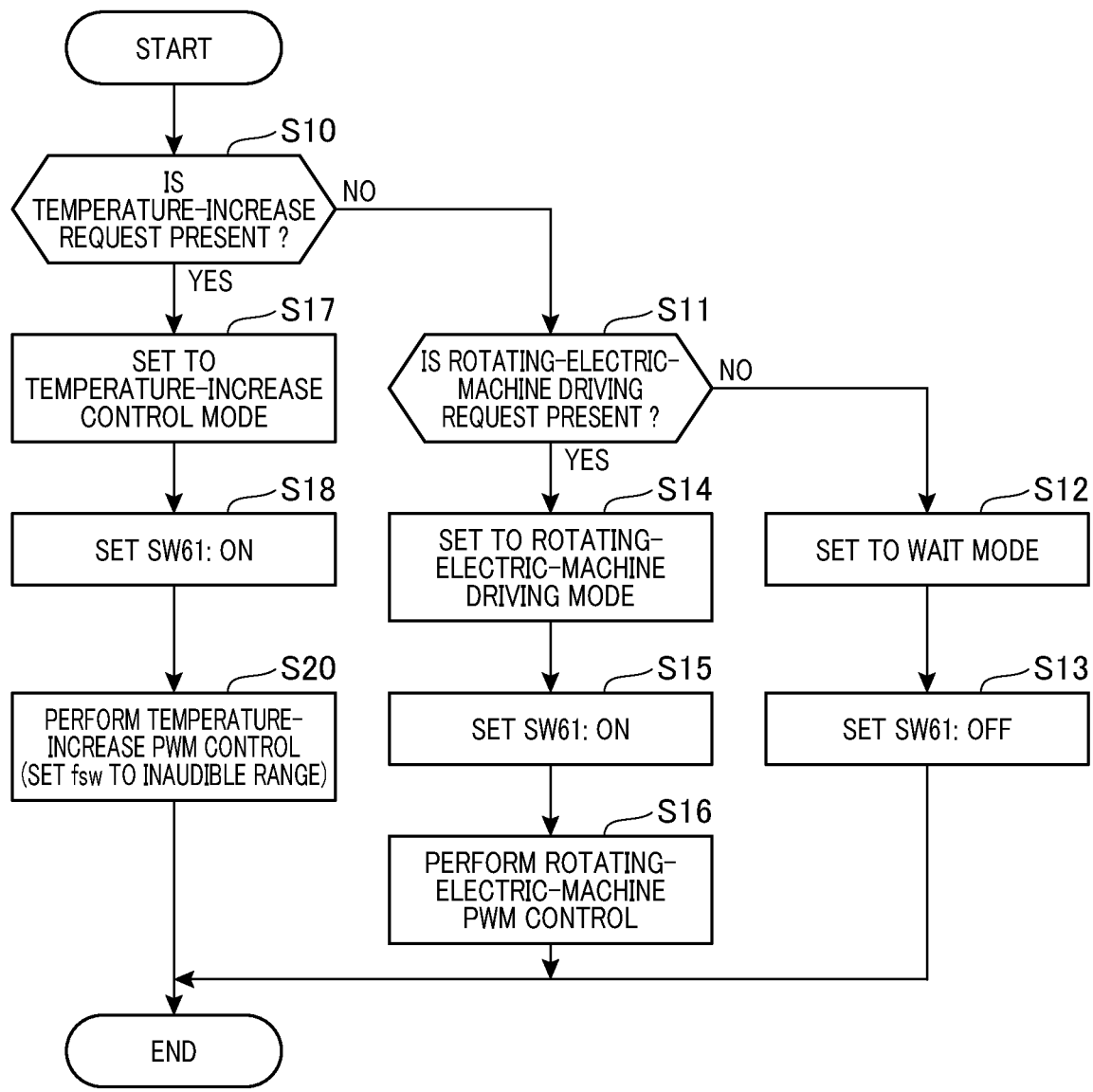
FIG. 15 is a flowchart of processing steps of a control apparatus according to a third embodiment.

FIG. 15 shows the steps in the temperature-increase control process according to the present embodiment. For example, the control apparatus 70 repeatedly performs this process at a predetermined control cycle. Here, in FIG. 15, processes that are identical to the processes shown in foregoing FIG. 2 are given the same reference numbers for convenience.

After completion of the process at step S18, the control apparatus 70 proceeds to step S20 and performs the temperature-increase PWM control. Here, the switching frequency fsw of the switches QUH to QWL is set to be higher than the switching frequency that is set in the process at step S16. Specifically, the switching frequency fsw is set to a frequency that is equal to or higher than 16 kHz and is, for example, set to a frequency in the human inaudible range (equal to or higher than 20 kHz).

Temperature-increase control is performed while the vehicle is stopped. A state such as this is a state in which sensitivity of human hearing to noise accompanying switching control of the inverter 30 is heightened. Therefore, as a result of the switching frequency fsw being set to a frequency that is equal to or higher than 16 kHz at which hearing by humans becomes difficult, and that is a frequency that is not in the inaudible range or a frequency that is in the inaudible range, NVH characteristics of the power conversion apparatus 10 during temperature-increase control can be improved. Here, because the frequency that is equal to or higher than 16 kHz is an excessively high frequency, heat generation in the switches QUH to QWL accompanying switching loss is a concern. However, because the vicinity of the vehicle is a low-temperature environment in temperature-increase control, risk of the temperature of the switches QUH to QWL exceeding an allowable upper-limit value is small.

Fourth Embodiment

Figure 16:
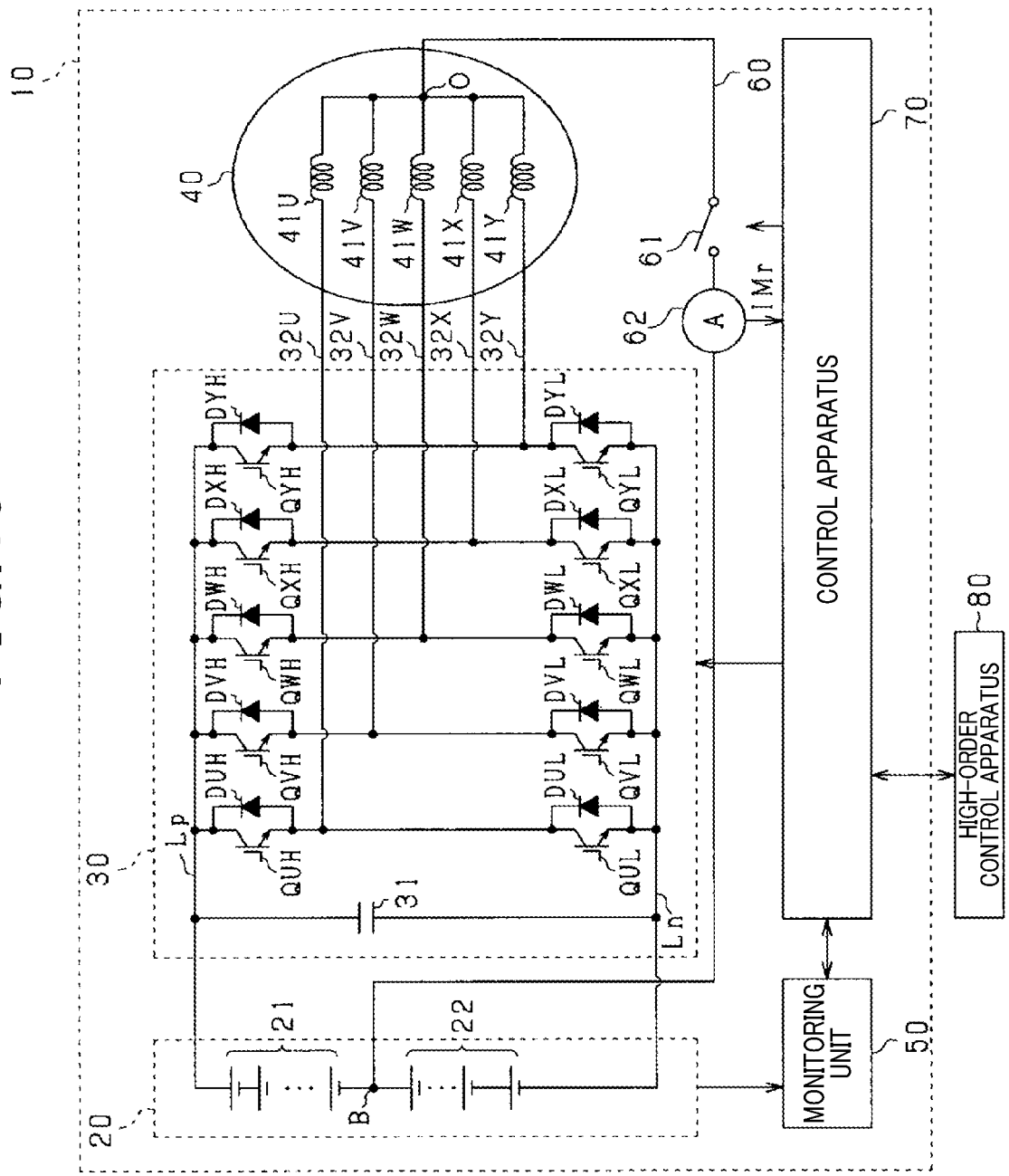
FIG. 16 is a configuration diagram of a power conversion apparatus according to a fourth embodiment.

According to the first embodiment, the rotating electric machine and the inverter may be other than those of three phases, such as five phases or seven phases. FIG. 16 shows a power conversion apparatus in the case of five phases. In FIG. 16, configurations that are identical to the configurations shown in foregoing FIG. 1 are given the same reference numbers for convenience.

In FIG. 16, in the inverter 30, X-phase upper and lower arm switches QXH and QXL and diodes DXH and DXL are added, and Y-phase upper and lower arm switches QYH and QYL and diodes DYH and DYL are added. In addition, in the rotating electric machine 40, an X-phase winding 41X and a Y-phase winding 41Y are added. Furthermore, in the power conversion apparatus 10, an X-phase conductive member 32X and a Y-phase conductive member 32Y are added.

Fifth Embodiment

A fifth embodiment will be described below with reference to the drawings, mainly focusing on differences with the first embodiment.

Figure 17:
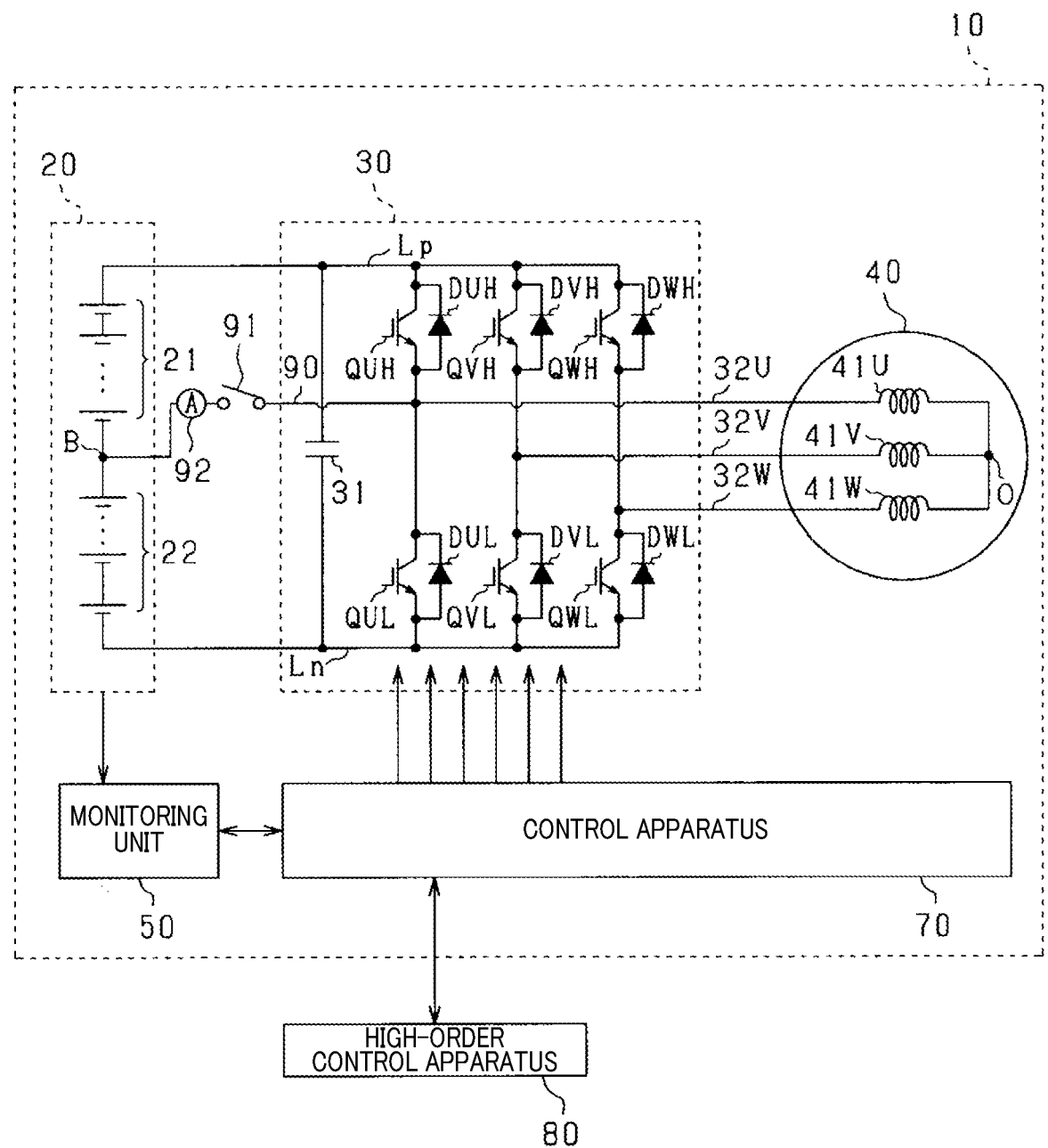
FIG. 17 is a configuration diagram of a power conversion apparatus according to a fifth embodiment.

FIG. 17 shows a configuration diagram of a power conversion apparatus according to the present embodiment. In FIG. 17, configurations that are identical to the configurations shown in foregoing FIG. 1 are given the same reference numbers for convenience.

In the configuration according to the first embodiment shown in foregoing FIG. 1, the power conversion apparatus 10 includes the connection path 60, the connection switch 61, and the current sensor 62. Instead of these configurations, according to the present embodiment, the power conversion apparatus 10 includes a connection path 90, a connection switch 91, and a current sensor 92. The intermediate terminal B of the assembled battery 20 is connected to the emitter of the U-phase upper arm switch QUH and the collector of the U-phase lower arm switch QUL by the connection path 90. The connection switch 91 and the current sensor 92 are provided on the connection path 90.

According to the present embodiment as well, the control apparatus 70 performs the temperature-increase control process by the steps shown in foregoing FIG. 2. Here, the connection switch 61 at steps S13, S15, and S18 is replaced by the connection switch 91. The equivalent circuit of the power conversion apparatus 10 that is used in the temperature-increase PWM control according to the present embodiment is identical to the circuit shown in foregoing FIG. 3. In addition, in the temperature-increase control process according to the present embodiment, a method for switching control in the temperature-increase PWM control at step S19 is modified. This control will be described below.

Figure 18:
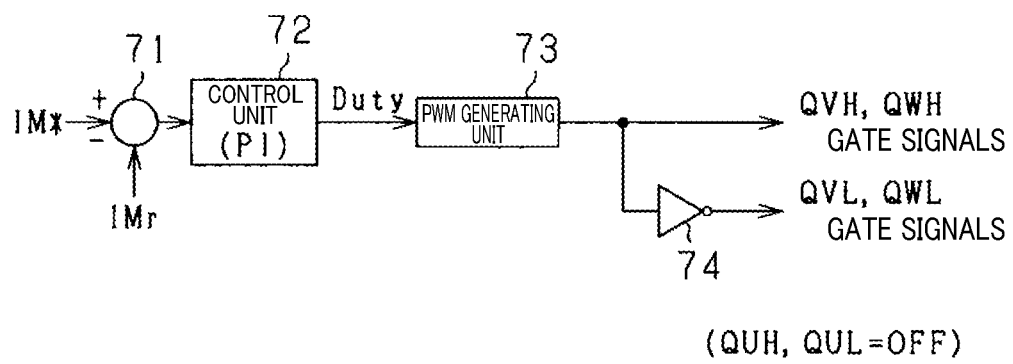
FIG. 18 is a functional block diagram of a control apparatus.

FIG. 18 shows a block diagram of the temperature-increase PWM control according to the present embodiment. Here, in FIG. 18, the configurations of the current deviation calculating unit 71 and the feedback control unit 72, and the setting method for the command current IM* are similar to those according to the first embodiment. Therefore, descriptions thereof are omitted.

Figure 19:
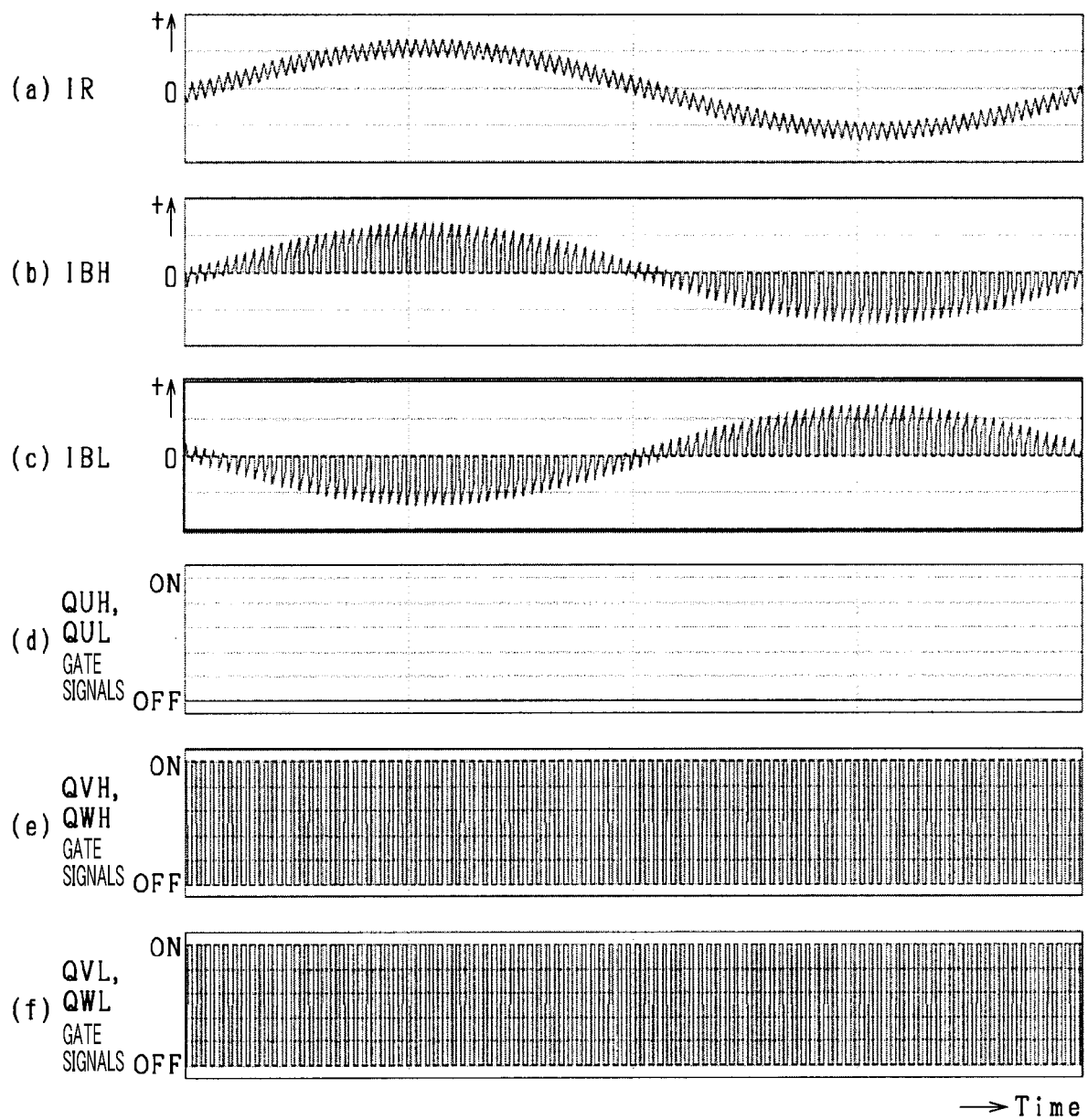

The PWM generating unit 73 generates the gate signals of the V- and W-phase upper arm switches QVH and QWH based on the duty ratio Duty calculated by the feedback control unit 72. The inverting unit 74 generates the gate signals of the V- and W-phase lower arm switches QVL and QWL by inverting the logics of the gate signals of the V- and W-phase upper arm switches QVH and QWH. According to the present embodiment, the U-phase upper and lower arm switches QUH and QUL are controlled to be off. In addition, switching control of the V- and W-phase upper arm switches QVH and QWH is synchronized, and switching control of the V- and W-phase lower arm switches QVL and QWL is synchronized FIG. 19 shows the transitions in the current IR and the like according to the present embodiment. FIG. 19(a) shows the transitions in the current IR that flow to the connection path 90. FIG. 19(b) shows the transitions in the current IBH that flows to the first storage battery 21. FIG. 19(c) shows the transitions in the current IBL that flows to the second storage battery 22. FIG. 19(d) shows the transitions in the gate signals of the U-phase upper and lower arm switches QUH and QUL. FIG. 19(e) shows the transitions in the gate signals of the V- and W-phase upper arm switches QVH and QWH. FIG. 19(f) shows the transitions in the gate signals of the V- and W-phase lower arm switches QVL and QWL.

According to the present embodiment, as shown in FIG. 19(d), the U-phase upper and lower arm switches QUH and QUL are controlled to be off. In addition, as shown in FIGS. 19(e) and (f), the V- and W-phase upper arm switches QVH and QWH and the V- and W-phase lower arm switches QVL and QWL are alternately controlled to be on. As a result of this control, as shown in FIGS. 19(b) and (c), pulse-like currents flow to the first storage battery 21 and the second storage battery 22. As shown in FIG. 19(a), the current IR is controlled to the command current IM*.

Figure 20:
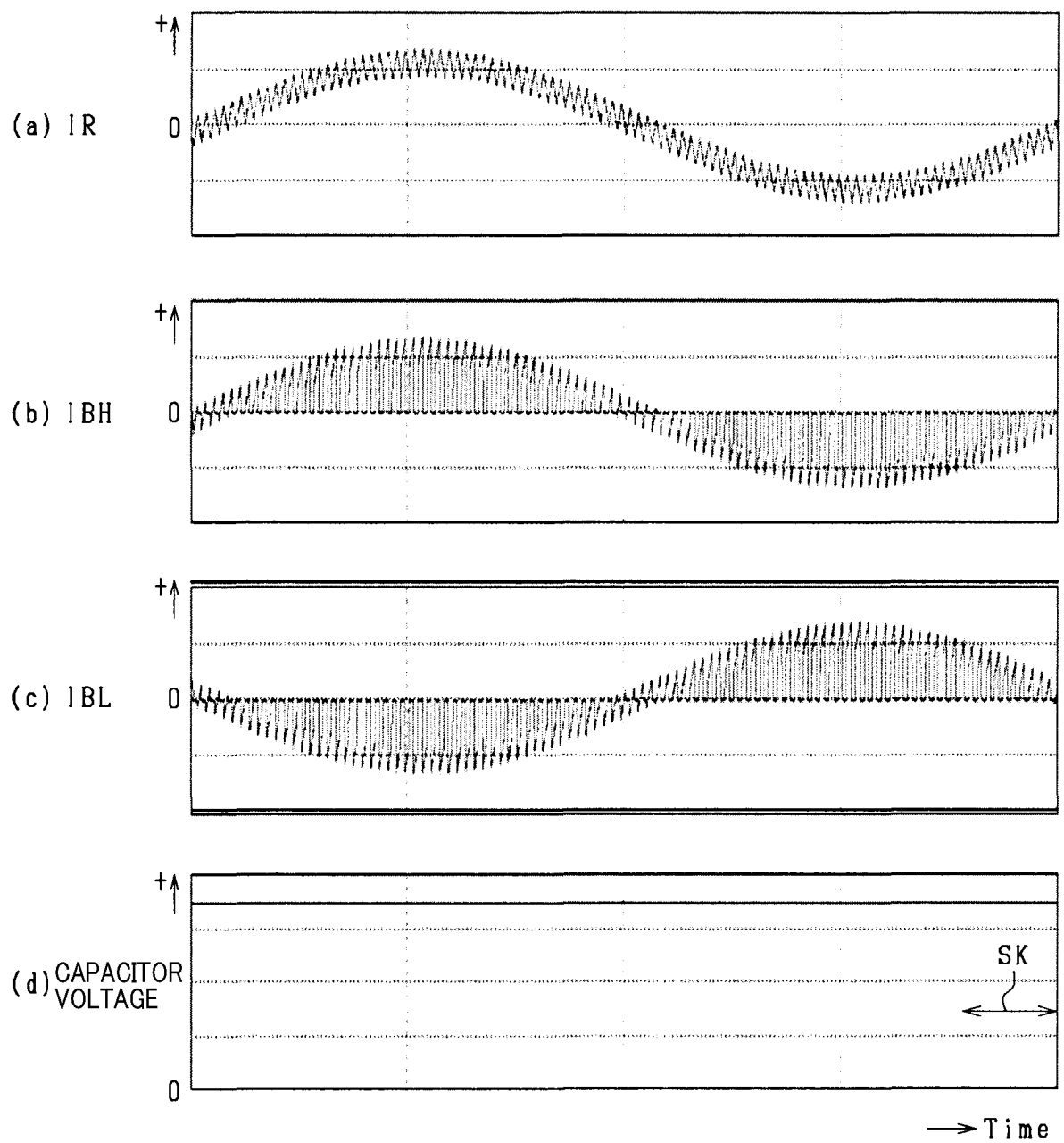
FIG. 20 is a diagram of simulation results.

FIG. 20 shows simulation results according to the present embodiment. FIGS. 20(a) to (c) correspond to foregoing FIGS. 19(a) to (c). FIG. 20(d) shows the transitions in the terminal voltage of the capacitor 31. As shown in FIG. 20(d), the terminal voltage of the capacitor 31 does not vary. SK shown in FIG. 20(d) is a reference number for indicating a scale of the time axis and corresponds to SK shown in foregoing FIG. 8(b).

According to the present embodiment described in detail above, following effects can be obtained.

The intermediate terminal B of the assembled battery 20 is connected to the emitter of the U-phase upper arm switch QUH and the collector of the U-phase lower arm switch QUL by the connection path 90. In this configuration, the control apparatus 70 controls switching of the switches QUH to QWL such that a ripple current flows between the first storage battery 21 and the second storage battery 22 through the V- and W-phase upper and lower arm switches QVH, QWH, QVL, and QWL, the phase windings 41U, 41V, and 41W, and the connection path 90. Consequently, effects similar to those according to the first embodiment can be obtained.

The control apparatus 70 synchronizes switching control of the V- and W-phase upper arm switches QVH and QWH, and synchronizes switching control of the V- and W-phase lower arm switches QVL and QWL in temperature-increase control. As a result, the V- and W-phase windings 41V and 41W can be considered to be an equivalent circuit in which the windings are connected in parallel. Therefore, the inductance of the windings during temperature-increase control can be reduced.

Variation Example 1 According to the Fifth Embodiment

Figure 21:
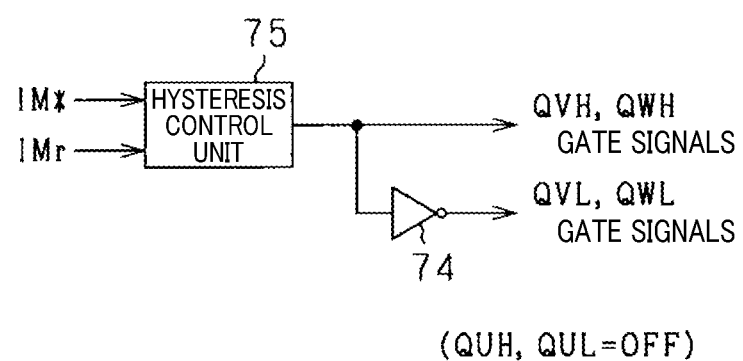
FIG. 21 is a functional block diagram of the control apparatus in a variation example 1 according to the fifth embodiment.

Switching control may be performed by a configuration shown in FIG. 21, instead of the configuration in FIG. 18. In the control apparatus 70, the hysteresis control unit 75 generates the gate signals of the V- and W-phase upper arm switches QVH and QWH based on the command current IM* and the detection current IMr. The inverting unit 74 generates the gate signals of the V- and W-phase lower arm switches QVL and QWL by inverting the logics of the gate signals of the V- and W-phase upper arm switches QVH and QWH generated by the hysteresis control unit 75.

Variation Example 2 According to the Fifth Embodiment

Figure 22:
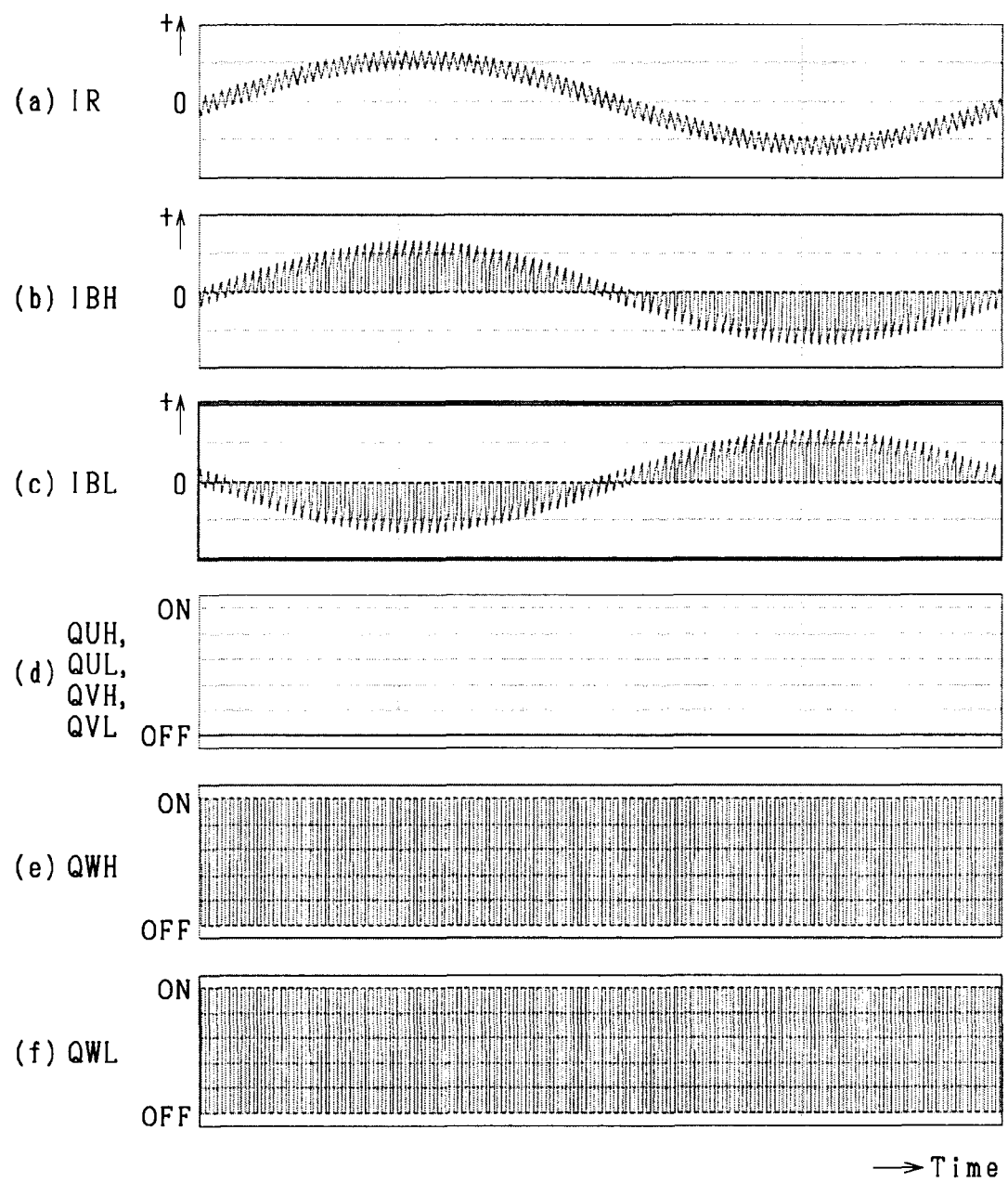
FIG. 22 is a timing chart of transitions in the control aspect of the switches and the like in a variation example 2 according to the fifth embodiment.

The control unit 70 may perform the temperature-increase PWM control in which only a single phase is controlled to be on/off. FIG. 22 shows an example in which the W-phase upper and lower arm switches QWH and QWL are controlled to be on/off. FIGS. 22(a) to (c) correspond to foregoing FIGS. 19(a) to (c). FIG. 22(d) shows the transitions in the gate signals of the U- and V-phase upper and lower arm switches QUH, QUL, QVH, and QVL. FIG. 22(e) shows the transitions in the gate signal of the W-phase upper arm switch QWH. FIG. 22(f) shows the transitions in the gate signal of the W-phase lower arm switch QWL.

According to the present embodiment, as shown in FIG. 22(d), the U- and V-phase upper and lower arm switches QUH, QUL, QVH, and QVL are turned off. In addition, as shown in FIGS. 22(e) and (f), the W-phase upper arm switch QWH and the W-phase lower arm switch QWL are alternately controlled to be on.

In switching control shown in FIG. 22, when the ripple current is small, the equivalent inductance of the winding 41 can be increased and current ripple can be reduced. Iron loss can be reduced compared to when switching control of the V- and W-phases is performed.

Variation Example 3 According to the Fifth Embodiment

The control apparatus 70 may perform temperature-increase control by the steps shown in foregoing FIG. 15. In this case, after completion of the process at step S18 in foregoing FIG. 15, the control apparatus 70 proceeds to step S20 and performs the temperature-increase PWM control. According to the present embodiment, the switching frequency fsw of the V- and W-phase upper and lower arm switches QVH, QVL, QWH, and QWL is set to be higher than the switching frequency that is set in the process at step S16. Consequently, effects similar to those according to the third embodiment can be obtained.

Variation Example 4 According to the Fifth Embodiment

As described according to the second embodiment, the control apparatus 70 may correct the command current IM* such that the terminal voltage of the first storage battery 21 and the terminal voltage of the second storage battery 22 are equalized. Consequently, effects similar to those according to the second embodiment can be obtained.

Variation Example 5 According to the Fifth Embodiment

The upper and lower arm switches that are connected to the intermediate terminal B of the assembled battery 20 are not limited to the U-phase upper and lower arm switches QUH and QUL and may, for example, be the V-phase upper and lower arm switches QVH and QVL. In this case, in temperature-increase control, the V-phase upper and lower arm switches QVH and QVL are controlled to be off. In addition, the U- and W-phase upper arm switches QUH and QWH and the U- and W-phase lower arm switches QUL and QWL are alternately controlled to be on.

In addition, the upper and lower arm switches that are connected to the intermediate terminal B of the assembled battery 20 may, for example, be the W-phase upper and lower arm switches QWH and QWL. In this case, in temperature-increase control, the W-phase upper and lower arm switches QWH and QWL are controlled to be off. In addition, the U- and V-phase upper arm switches QUH and QVH and the U- and V-phase lower arm switches QUL and QVL are alternately controlled to be on.

Sixth Embodiment

A sixth embodiment will be described below with reference to the drawings, mainly focusing on differences with the fifth embodiment. According to the present embodiment, the upper and lower switches that are connected to the intermediate terminal B of the assembled battery 20 is not limited to a single phase. All that is required is that intermediate terminal B is connected to the upper and lower arm switches of all of the U-, V- and W-phases.

Figure 23:
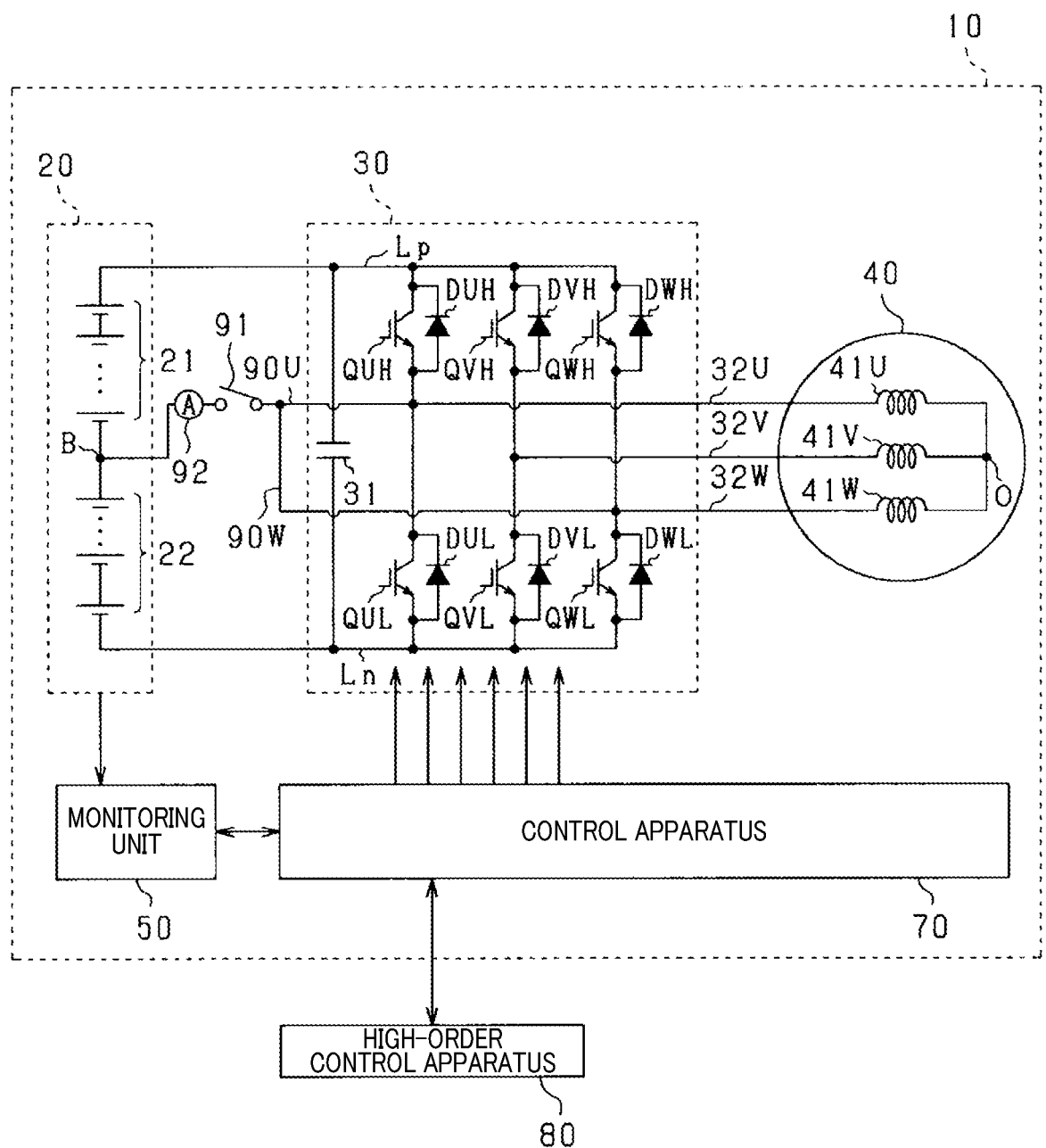
FIG. 23 is a configuration diagram of a power conversion apparatus according to a sixth embodiment.

FIG. 23 shows a configuration diagram of the power conversion apparatus when the U-phase upper and lower arm switches QUH and QUL and the W-phase upper and lower arm switches QWH and QWL are connected to the intermediate terminal B of the assembled battery 20. According to the present embodiment, the intermediate terminal B of the assembled battery 20 is connected to the emitter of the U-phase upper arm switch QUH and the collector of the U-phase lower arm switch QUL by a U-phase connection path 90U. In addition, the intermediate terminal B of the assembled battery 20 is connected to the emitter of the W-phase upper arm switch QWH and the collector of the W-phase lower arm switch QWL by a W-phase connection path 90W.

According to the present embodiment, when the temperature-increase PWM control is performed, the U- and W-phase upper and lower arm switches QUH, QUL, QWH, and QWL are controlled to be off. In addition, the V-phase upper arm switch QVH and the V-phase lower arm switch QVL are alternately controlled to be on.

According to the present embodiment described above, effects similar to those according to the fifth embodiment can be obtained.

Seventh Embodiment

Figure 24:
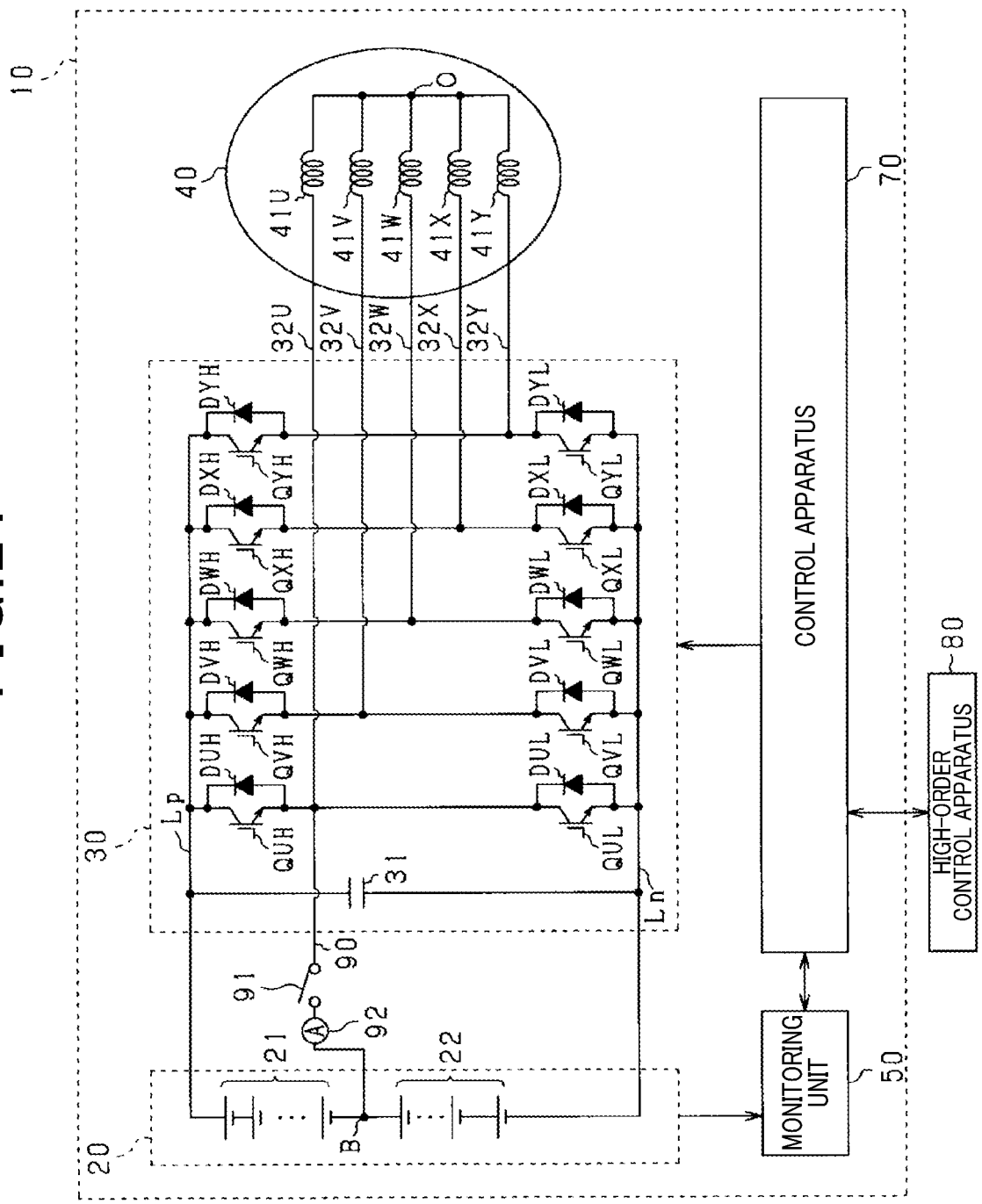
FIG. 24 is a configuration diagram of a power conversion apparatus according to a seventh embodiment.

According to the fifth embodiment, the rotating electric machine and the inverter may be other than those of three phases, such as five phases or seven phases, as described according to the fourth embodiment. FIG. 24 shows a power conversion apparatus in the case of five phases. In FIG. 24, configurations that are identical to the configurations shown in foregoing FIG. 17 are given the same reference numbers for convenience.

Other Embodiments

Here, the above-described embodiments may be modified in the following manner.

A setup location of the current sensor that detects the current that flows to the neutral point O is not limited to that in the example in FIG. 1. For example, a current sensor may be provided in each of the conductive members 32U, 32V, and 32W in FIG. 1. In this case, during temperature-increase control, a total value of the currents detected by the current sensors provided in the conductive members 32U, 32V, and 32W may be the detection current IMr.

The setting method for the command current IM* is not limited to that shown in FIG. 5. For example, the positive command current IM* and the negative command current IM* can each be set to a trapezoidal wave or a rectangular wave, while the relationship in which the positive command current IM* and the negative command current IM* have point symmetry in relation to the zero-crossing timing of the command current IM* in the single cycle Tc is satisfied.

In addition, the setting method for the command current IM* is not limited to that in which the above-described point symmetrical relationship is satisfied. For example, the command current IM* may be set such that the period from the zero up-crossing timing to the zero down-crossing timing of the command current IM* and the period from the zero down-crossing timing to the zero up-crossing timing of the command current IM* differ, and the area S1 of the first region and the area S2 of the second region are equal in the single cycle Tc. In this case as well, charging and discharge currents of the first storage battery 21 and the second storage battery 22 in the single cycle Tc can be balanced.

Respective numbers of battery cells of the first storage battery 21 and the second storage battery 22 may differ. In this case, the terminal voltage of the first storage battery 21 and the terminal voltage of the second storage battery 22 differ. In addition, the intermediate terminal B is provided in a position in which the battery cells configuring the assembled battery 20 are not equally divided.

According to the first embodiment, in temperature-increase control, the control apparatus 70 may not synchronize switching control of the upper arm switches QUH, QVH, and QWH of all phases, and may not synchronize switching control of the lower arm switches QUL, QVL, and QWL of all phases.

The connection switch 61 is not limited to the relay. For example, a pair of N-channel metal-oxide-semiconductor field-effect transistors (MOSFETs) of which sources are connected to each other, or an IGBT may be used.

According to the first to fourth embodiments, the connection switch 61 is not a requisite. In this case, the intermediate terminal B and the neutral point O are electrically connected at all times.

The upper and lower arm switches that configure the inverter are not limited to the IGBTs and may, for example, be N-channel MOSFETs. In this case, the high-potential-side terminal is a drain and the low-potential-side terminal is the source.

The first storage battery and the second storage battery may not configure an assembled battery.

The control unit and the method thereof described in the present disclosure may be implemented by a dedicated computer that is provided so as to be configured by a processor and a memory, the processor being programmed to provide one or a plurality of functions that are realized by a computer program. Alternatively, the control unit and the method thereof described in the present disclosure may be implemented by a dedicated computer that is provided by a processor being configured by a single dedicated hardware logic circuit or more.

Still alternatively, the control unit and the method thereof described in the present disclosure may be implemented by a single dedicated computer or more, the dedicated computer being configured by a combination of a processor that is programmed to provide one or a plurality of functions, a memory, and a processor that is configured by a single hardware logic circuit or more. In addition, the computer program may be stored in a non-transitory tangible recording medium that can be read by a computer as instructions performed by the computer.

While the present disclosure has been described with reference to embodiments thereof, it is to be understood that the disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

What is claimed is:

1. A power conversion apparatus comprising:
    a multi-phase rotating electric machine that has a winding;
    a multi-phase inverter that has a series-connection body of an upper arm switch and a lower arm switch; and
    a capacitor that is connected in parallel to the series-connection body, wherein
    the power conversion apparatus includes
        a connection path that, in a first storage battery and a second storage battery that are connected in series, electrically connects the winding with both a negative-electrode side of the first storage battery and a positive-electrode side of the second storage battery,
        a connection switch that is provided on the connection path, electrically connects the negative-electrode side of the first storage battery and the positive-electrode side of the second storage battery in response to the connection switch being set to be in an on-state, and electrically interrupts connection between the negative-electrode side of the first storage battery and the positive-electrode side of the second storage battery in response to the connection switch being set to be in an off-state, and
        a control unit that controls switching of the upper arm switch and the lower arm switch such that a current flows between the first storage battery and the second storage battery through the inverter, the winding, and the connection path.

2. The power conversion apparatus according to claim 1, wherein:
    the control unit controls switching of the upper arm switch and the lower arm switch of at least two phase such that a current flows between the first storage battery and the second storage battery through the inverter, the winding, and the connection path.

3. The power conversion apparatus according to claim 1, wherein:
    the control unit synchronizes switching control of upper arm switches of all phases and synchronizes switching control of lower arm switches of all phases such that the current flows between the first storage battery and the second storage battery through the inverter, the winding, and the connection path.

4. The power conversion apparatus according to claim 1, wherein:
    the control unit sets the connection switch to be in the on-state when determined that a temperature-increase request regarding the first storage battery and the second storage battery is present, and sets the connection switch to be in the off state when determined that the temperature-increase request is not present.

5. The power conversion apparatus according to claim 1, wherein:
    the control unit sets a switching frequency of switching control when driving of the rotating electric machine is stopped to a frequency that is higher than a switching frequency of the upper and lower arm switches when the rotating electric machine is driven.

6. The power conversion apparatus according to claim 1, wherein:
    the connection path electrically connects a neutral point of the winding with both the negative-electrode side of the first storage battery and the positive-electrode side of the second storage battery.

7. The power conversion apparatus according to claim 1, further comprising:
    a voltage information detecting unit that detects voltage information of the first storage battery and the second storage battery, wherein
    the control unit corrects the command value such that a terminal voltage of the first storage battery and a terminal voltage of the second storage battery are equalized based on the detected voltage information.

8. A power conversion apparatus comprising:
    a multi-phase rotating electric machine that has a winding;
    a multi-phase inverter that has a series-connection body of an upper arm switch and a lower arm switch; and
    a capacitor that is connected in parallel to the series-connection body, wherein
    the power conversion apparatus includes
        a connection path that, in a first storage battery and a second storage battery that are connected in series, electrically connects the winding with both a negative-electrode side of the first storage battery and a positive-electrode side of the second storage battery, and
        a control unit that controls switching of the upper arm switch and the lower arm switch such that a current flows between the first storage battery and the second storage battery through the inverter, the winding, and the connection path, wherein the control unit sets the command value such that, in a single cycle of a command value of a current that flows to the connection path, an area of a region that is prescribed by the command value that is positive and an area of a region that is prescribed by the command value that is negative are equal, and controls switching to control the current that flows to the connection path to the command value.

9. The power conversion apparatus according to claim 8, wherein:
the control unit controls switching of the upper arm switch and the lower arm switch of at least two phase such that a current flows between the first storage battery and the second storage battery through the inverter, the winding, and the connection path.

10. The power conversion apparatus according to claim 8, wherein:
the control unit synchronizes switching control of upper arm switches of all phases and synchronizes switching control of lower arm switches of all phases such that the current flows between the first storage battery and the second storage battery through the inverter, the winding, and the connection path.

11. The power conversion apparatus according to claim 8, wherein:
the control unit sets a switching frequency of switching control when driving of the rotating electric machine is stopped to a frequency that is higher than a switching frequency of the upper and lower arm switches when the rotating electric machine is driven.

12. The power conversion apparatus according to claim 8, wherein:
the control unit sets the command value such that the command value that is positive and the command value that is negative have point symmetry in relation to a zero-crossing timing of the command value in the single cycle of the command value.

13. The power conversion apparatus according to claim 12, wherein:
a frequency that is an inverse of the single cycle of the command value is set to a frequency between 30 Hz and 100 Hz.

14. The power conversion apparatus according to claim 8, wherein:
the connection path electrically connects a neutral point of the winding with both the negative-electrode side of the first storage battery and the positive-electrode side of the second storage battery.

15. The power conversion apparatus according to claim 8, further comprising:
a voltage information detecting unit that detects voltage information of the first storage battery and the second storage battery, wherein
the control unit corrects the command value such that a terminal voltage of the first storage battery and a terminal voltage of the second storage battery are equalized based on the detected voltage information.

16. A power conversion apparatus comprising:
a multi-phase rotating electric machine that has a winding;
a multi-phase inverter that has a series-connection body of an upper arm switch and a lower arm switch; and
a capacitor that is connected in parallel to the series-connection body, wherein
in each phase, a connection point of the upper arm switch and the lower arm switch configuring the series-connection body;
the power conversion apparatus includes
a connection path that, in a first storage battery and a second storage battery that are connected in series, electrically connects a negative-electrode side of the first storage battery and a positive-electrode side of the second storage battery, with a connection point of the upper arm switch and the lower arm switch that configure the series-connection body of a portion of a plurality of phases,
a control unit that controls switching of the upper arm switch and the lower arm switch such that a current flows between the first storage battery and the second storage battery through the inverter, the winding, and the connection path, and
a connection switch that is provided on the connection path, and electrically connects the negative-electrode side of the first storage battery and the positive-electrode side of the second storage battery in response to the connection switch being set to be in an on-state, and electrically interrupts connection between the negative-electrode side of the first storage battery and the positive electrode-side of the second storage battery in response to the connection switch being set to be in an off-state;
a phase of the plurality of phases in which the connection path is not connected is two phases or more; and
when a current flows between the first storage battery and the second storage battery through the connection path, the control unit
sets the connection switch to be in the on-state,
controls the upper arm switch and the lower arm switch of a phase of the plurality of phases, in which the connection path is connected to the connection point, to be in an off-state, and
controls switching of the upper arm switch and the lower arm switch of at least two phases of the plurality of phases in which the connection path is not connected to the connection point.

17. The power conversion apparatus according to claim 16, wherein:
the control unit synchronizes switching control of the upper arm switches of all phases of the plurality of phases in which the connection path is not connected, and synchronizes switching control of the lower arm switches of all phases in which the connection path is not connected among the plurality of phases, such that the current flows between the first storage battery and the second storage battery through the inverter, the winding, and the connection path.

18. The power conversion apparatus according to claim 16, wherein:
the control unit sets the connection switch to be in the on-state when determined that a temperature-increase request regarding the first storage battery and the second storage battery is present, and sets the connection switch to be in the off state when determined that the temperature-increase request is not present.

19. The power conversion apparatus according to claim 16, wherein:
the control unit sets a switching frequency of switching control when driving of the rotating electric machine is stopped to a frequency that is higher than a switching frequency of the upper and lower arm switches when the rotating electric machine is driven.

20. The power conversion apparatus according to claim 16, wherein:

the control unit sets the command value such that, in a single cycle of a command value of a current that flows to the connection path, an area of a region that is prescribed by the command value that is positive and an area of a region that is prescribed by the command value that is negative are equal, and controls switching to control the current that flows to the connection path to the command value.

* * * * *